US011111852B2

(12) United States Patent
Lee

(10) Patent No.: US 11,111,852 B2
(45) Date of Patent: Sep. 7, 2021

(54) ROTARY ENGINE, APPARATUS INCLUDING THE SAME, AND METHODS OF MAKING AND USING THE SAME

(71) Applicant: Brent Wei-Teh Lee, Saratoga, CA (US)

(72) Inventor: Brent Wei-Teh Lee, Saratoga, CA (US)

( * ) Notice: Subject to any disclaimer, the term of this patent is extended or adjusted under 35 U.S.C. 154(b) by 0 days.

(21) Appl. No.: 16/951,808

(22) Filed: Nov. 18, 2020

(65) Prior Publication Data

US 2021/0148282 A1    May 20, 2021

Related U.S. Application Data

(60) Provisional application No. 62/936,875, filed on Nov. 18, 2019.

(51) Int. Cl.
| | |
|---|---|
| *F02K 7/00* | (2006.01) |
| *F02C 3/16* | (2006.01) |
| *F02C 7/22* | (2006.01) |
| *F02C 7/264* | (2006.01) |

(52) U.S. Cl.
CPC ............ *F02C 3/165* (2013.01); *F02C 7/222* (2013.01); *F02C 7/264* (2013.01); *F02K 7/005* (2013.01); *F05D 2220/32* (2013.01); *F05D 2220/76* (2013.01); *F05D 2240/242* (2013.01); *F05D 2240/35* (2013.01)

(58) Field of Classification Search
CPC .. F02C 3/14; F02C 3/165; F02K 7/005; F05D 2220/32; F05D 2220/76; F05D 2240/242; F05D 2240/35
See application file for complete search history.

(56) References Cited

U.S. PATENT DOCUMENTS

| | | | | |
|---|---|---|---|---|
| 2,465,856 A | * | 3/1949 | Emigh | F02K 7/005 416/22 |
| 2,474,685 A | * | 6/1949 | McCollum | F02K 7/005 416/21 |
| 2,499,863 A | * | 3/1950 | Hart | F02C 3/165 60/39.35 |
| 3,059,428 A | * | 10/1962 | Otto | F02C 3/16 60/39.35 |

(Continued)

*Primary Examiner* — Steven M Sutherland
(74) *Attorney, Agent, or Firm* — Andrew D. Fortney; Central California IP Group, P.C.

(57) ABSTRACT

A rotary disk, useful for transferring kinetic energy or generating torque or electricity, is disclosed. The rotary disk includes a housing enclosing a manifold, an axle or shaft to which the housing is joined or fixed, conduits or passages within and/or extending from the housing, combustion chambers at distal ends of the conduits or passages and external to the housing, nozzles at distal ends of the combustion chambers, and a compressor in or upstream from the manifold. The conduits or passages are joined or fixed to the housing, and carry an oxygen-containing gas from the manifold to the nozzles. The nozzles direct the heated oxygen-containing gas and combustion gases in a predetermined direction. The compressor includes fins or blades joined or fixed to the axle or shaft, or to a different, colinear axle or shaft. The compressor is configured to increase a pressure of the oxygen-containing gas at entrances of the conduits or passages.

20 Claims, 10 Drawing Sheets

(56) References Cited

U.S. PATENT DOCUMENTS

| | | | | |
|---|---|---|---|---|
| 4,302,683 | A * | 11/1981 | Burton | F02C 3/165 |
| | | | | 290/4 R |
| 5,408,824 | A * | 4/1995 | Schlote | F02C 3/165 |
| | | | | 60/39.35 |
| 6,672,048 | B2 * | 1/2004 | Johnstone | F02C 3/165 |
| | | | | 60/39.35 |
| 10,508,544 | B2 | 12/2019 | Lee | |
| 10,519,858 | B2 | 12/2019 | Lee | |
| 10,544,735 | B2 | 1/2020 | Lee | |
| 2005/0241315 | A1 * | 11/2005 | Schlote | F02C 3/165 |
| | | | | 60/772 |
| 2018/0023472 | A1 | 1/2018 | Lee | |
| 2020/0123975 | A1 | 4/2020 | Lee | |

\* cited by examiner

ROTARY ENGINE, APPARATUS INCLUDING THE SAME, AND METHODS OF MAKING AND USING THE SAME

CROSS REFERENCE TO RELATED APPLICATION

This application claims the benefit of U.S. Provisional Patent Application No. 62/936,875, filed on Nov. 18, 2019, incorporated herein by reference as if fully set forth herein.

FIELD OF THE INVENTION

The present invention generally relates to the field of engines and power generation. More specifically, embodiments of the present invention pertain to a rotary disk apparatus and methods for converting energy and/or generating electricity using the same.

DISCUSSION OF THE BACKGROUND

FIGS. 1A-B are diagrams showing an engine according to U.S. patent application Ser. No. 15/641,760, filed Jul. 5, 2017, the relevant portions of which are incorporated herein by reference. FIGS. 1A-1B show an exemplary rotary device (e.g., rotary jet) 100, comprising a central axle or shaft 101, an inlet (e.g., a fluid inlet) 105 configured to receive at least one fluid (e.g., a flowable fluid), a plurality of radial arms (e.g., rotation arms) 110a-d extending radially from the inlet 105, and a nozzle 115a-d at a distal end of each rotating arm 110a-d. The radial arms 110a-d have an arc between the inlet 105 and the nozzle 115a-d, and the radial arms 110a-d are configured to rotate when the fluid enters the inlet 105 and passes through the arms 110a-d, or when a rotational force is applied to the central axle or shaft 101. Each rotating arm 110a-b may be curved or rounded, and may have a tubular or substantially tubular cross-section. In addition, each nozzle 115a-d has an opening that faces away from the direction of rotation of the radial arms 110a-d.

FIG. 1A is a cross-sectional view of the exemplary rotary device 100 along the line B-B' in FIG. 1B. The central axle or shaft 101 is positioned along a central axis of the rotary device 100 and thus defines a rotation axis for the radial arms 110a-d. The central axle or shaft 101 extends through a lower or rear-facing surface of a manifold section 130 of the rotary device 100.

The inlet 105 receives at least one fluid and supplies the fluid to the plurality of radial arms 110a-d through the manifold 130. The inlet 105, manifold 130 and arms 110a-d may be unitary (e.g., one integrated piece), and the inlet 105 rotates radially around the central axle or shaft 105 along with the arms 110a-d. The inlet 105 may include a single conduit or path for the fluid, and the manifold 130 effectively splits the conduit or path into openings to the radial arms 110a-d. The central axle or shaft 101 may be joined, fastened and/or secured to the inlet 105, the manifold 130 and/or the radial arms 110a-d.

FIG. 1A shows radial arms 110a and 110b that extend from the manifold 130 and that spin or rotate around the central axle or shaft 101. A fluid (e.g., water or air) is fed to the radial arms 110a-b by the manifold 130. The radial arms 110a-b may be welded and/or connected by bolts, clamps or screws to the manifold 130, or formed integrally with the manifold 130. Dimensions of the inlet 105 and the radial arms 110a-b can be optimized for a certain rotation rate. Preferably, the rotary device 100 has an even number of radial arms 110a-b (e.g., 2, 4, 6, 8, etc.). However, the number of radial arms 110a-b may be 3, 5, 9, or any other positive integer by which 360 can be divided to give an integer or a regular fraction. Evenly-spaced, identical radial arms (e.g., 110a-110d, FIG. 1B) generally increase the efficiency and balance of the rotary device 100.

Each rotating arm 110a-d includes a nozzle 115a-d (see, e.g., FIG. 1B). The nozzle 115a on the rotating arm 110a is not shown in FIG. 1A because it faces away from the viewer (FIG. 1A is the cross-section of FIG. 1B along the B-B' line, viewing the cross-section in the direction of the arrows). The nozzles 115a-d are configured to expel the fluid and provide a rotation thrust and/or force to rotate the radial arms 110a-d around the central axle or shaft 101. In the rotary device 100, the centrifugal effect of the spinning radial arms 110a-b advantageously provides additional force or velocity to the fluid rushing out of the nozzles 115a-b, further increasing the rotational thrust and/or force on the radial arms 110a-b and/or the central axle or shaft 101, and reducing the force(s) opposing entry of the fluid into the inlet 105, positively reinforcing the flow of the fluid through the device 100 by a type of "self-amplification" mechanism.

In various embodiments, the device 100 may include aerodynamic surfaces 120a-b on or over the radial arms 110a-b. The aerodynamic surfaces 120a-b are configured to reduce the air resistance of the radial arms 110a-b during rotation. The aerodynamic surfaces 120a-b may include a disc or sheet having a circular or other shape optimized for aerodynamic function(s). The aerodynamic surface 120a may be the same as or different from the aerodynamic surface 120b. For example, the aerodynamic surfaces 120a-b may have a relatively sleek or angled shape that minimizes air resistance. The discs or sheets 120a-b may be attached or connected to the manifold 130 and/or arms 110a-d and may cover the spaces between the arms 110a-d (e.g., to form a disc), or be formed integrally with the manifold 130 and/or arms 110a-d. In some embodiments, the aerodynamic surfaces 120a-b cover the entire radial arms 110a-b, including the nozzles 115a-b. In other embodiments, the aerodynamic surfaces 120a-b may cover only part of the radial arms 110a-b. Dimensions of the aerodynamic surfaces 120a-b may vary, depending on the dimensions of the radial arms 110a-b and/or the desirability of minimizing air resistance.

In exemplary embodiments, fluid is received in an opening 106 of the inlet 105. As shown in FIG. 1B, the inlet 105 is a single conduit. The fluid passes through the radial arms 110a-d and rotates the radial arms 110a-d around the central axle or shaft 101, and is expelled out the nozzles 115a-d as thrust. The curved shape of the radial arms 110a-d (e.g., from the manifold 130 to nozzle 115) reduces the counterforce or back-pressure of the radial arms 110a-d onto the fluid entering the radial arms 110a-d.

Generally, the nozzles 115a-d can have a variety of shapes, including, but not limited to, circular, oval, curved, constricted, flared, combinations thereof, etc. Each of the nozzles 115a-d may be permanently or detachably connected to a corresponding rotating arm 110a-d or formed integrally with the rotating arm 110a-d. Nozzles 115a-d may be attached to the rotating arm 110a-d by various methods, including, but not limited to, welding, shrink fitting, gluing, screwing/threading, and/or compression fitting.

Each nozzle 115a-d is configured to expel the fluid from the corresponding arm 110a-d and provide a rotation thrust and/or force to rotate the radial arms 110a-d around the central axle or shaft 101. The nozzles 115a-d have an angle of about 90° relative to the line at which the corresponding rotating arm 110a-d extends from the inlet 105 and/or manifold 130. The nozzles 115*a-d* at the distal end of each rotating arm 110*a-d* has an opening facing away from the direction of rotation of the radial arms 110*a-d*. The opening or outlet of the nozzles 115*a-d* face or point in a direction substantially perpendicular to the shortest straight line between the central axle or shaft 101 and the opening of the nozzle 115*a-d*, thus providing the rotational thrust and/or force.

The centrifugal force from the rotational movement of the radial arms 110*a-d* accelerates the fluid down the arms 110*a-d*, which accelerates the expulsion of the fluid from the nozzles 115*a-d*. The fluid leaving the nozzles 115*a-d* functions as a propellant, which in turn causes and/or speeds up the rotational movement of the arms 110*a-d* around the central axle or shaft 101, increasing the amount of fluid being transported and/or energy being converted and positively reinforcing the rotational speed of the radial arms 110*a-d*.

When the direction of each nozzle 115*a-d* is perpendicular or substantially perpendicular to the corresponding rotating arm, the force acting on the rotating arm 110*a-d* and the rotation speed are maximized according to Newtonian mechanics. The centrifugal force from the rotational movement accelerates the fluid down the arms 110*a-d*, which accelerates the expulsion of fluid, which acts as a propellant. The centrifugal force on the fluid/propellant increases as the rotation speed increases, which in turn increases the rotational force/thrust and the amount of fluid being transported and/or energy being converted. As the rotational thrust and/or force increases, the rotation speed of the radial arms 110*a-d* also increases. This is considered a self-amplifying, controllable chain reaction (or positive reinforcement) that enables the thrust to reach supersonic speeds and many times beyond, without the burden of excess fuel consumption and/or expensive mechanical parts. As a result, the fluid exiting the nozzles 115*a-b* has considerable dynamic energy. However, a limit to the chain reaction and/or positive reinforcement may be reached when the fluid in the inlet 105 exerts a positive back-force on the fluid proximate to the inlet 105, but not yet in the device 100, although even then, the chain reaction or positive reinforcement functions to reduce the forces that oppose rotation of the radial arms 110*a-d*.

FIGS. 2A-B show an engine 200, in which FIG. 2A is a cross-sectional view along the B-B' plane in FIG. 2B. The housing 210 has an inner wall 203 that includes a plurality of openings 206, and an outer wall 202. The plurality of openings 206 in the inner wall 203 provide cross flow, reverse flow and/or cyclone flow, thus separately creating turbulence inside the housing 210. The housing 210 has a round or toroidal shape, with a space 204 within the inner wall 203 of the housing 210 configured to allow rotation of the propulsion vessels 240 and 245. The housing 210 may have an insulation layer 205 (e.g., thermo-insulative material) on the outer wall 202 of the housing 210.

The central rotary shaft 220 extends from the housing 210, either from the rear-facing surface 214 of the housing 210, or from both the front and rear-facing surfaces 212 and 214 of the housing 210. The central rotary shaft 220 may be connected or joined to a coaxial rod or cable 226 at one end, and the rod or cable 226 may have one or more gears or fans at another end (i.e., an opposite end of the rod or cable 226).

The fuel and air supply and/or distribution channel 230 advantageously supplies a fuel and an oxidizer (e.g., from a fuel storage tank) to the propulsion vessels 240 and 245. Similarly, the fuel and air supply and/or distribution channel 230 may have an opening 221 and one or two conduits or paths (e.g., 223 and 229). The fuel and air supply and/or distribution channel 230 has a first portion (e.g., 235 and/or 237, in one or both of the first and second arms 222 and 224) that extends radially from the rotary shaft 220, and a second portion (e.g., surrounding the rotary shaft 220) in fluidic communication with the first portion 235 and/or 237. The second portion of the fuel and air supply channel 230 may have an opening 225 for fuel and/or air supply along annular paths 235 and 237 to the propulsion vessels 240 and 245. For example, the second portion of the fuel and air supply channel 230 may carry an oxidizer (e.g., air, oxygen, oxygen-rich air, etc.) to the propulsion vessels 240 and 245 to facilitate greater and/or more thorough combustion of the fuel.

The fuel and air supply channel 230 may include bearings 227 configured to maintain an airtight supply of air, fuel or both to the housing 210. Also, the bearings 227 allow certain parts to rotate, while others stay fixed. Preferably, there are at least five sets of bearings 227 having a ring-shaped or toroidal cross-section located around the central shaft 220, as shown in FIG. 2A. The bearings 227 generally are positioned around the central shaft 220, between the central shaft 220 and an immediately adjacent part or unit (e.g., one or more conduits of the fuel and air supply channel 230, the front and/or rear surfaces 212 and 214 of the housing 210, or other surface of the housing 210).

The engine 200 includes at least two propulsion vessels 240, 245 (e.g., rocket-like engines). The propulsion vessels and arms may also be offset from each other in a regular pattern, relative to a horizontal plane passing through at least some of the propulsion vessels and/or arms (e.g., alternating burner/arm combinations may be above or below the horizontal B-B' plane through the engine 200 in FIG. 2A). One side or surface (e.g., a side or surface facing the central shaft 230) of each of the propulsion vessels 240 and 245 is connected to (i) a rotational arm 222 or 224, and (ii) the fuel and air supply channel 230. Each propulsion vessel is configured to burn or detonate the fuel, and rotate around the central rotary shaft 220. Preferably, the propulsion vessels include an igniter (not shown). The igniter may be downstream from an outlet or opening for the fuel and air mixture, and ignite the fuel fed into the propulsion vessel 240, 245 from the fuel and air supply channel 230.

The inner wall 203 of the housing 210 has a plurality of openings 206 leading to at least two exhaust ducts or ports 255, 256. In addition, the openings 206 may be located anywhere along the inner wall 203 of the housing 210. However, locations along the center of the inner wall (as shown) may be preferred. Furthermore, the openings 206 may be evenly spaced or concentrated (e.g., before or after the entrances to the ducts or exhaust ports 255, 256).

The engine 200 includes at least two exhaust ducts (vents or ports) 255, 256 that extend from the housing 210. The exhaust ducts 255, 256 may be configured to direct exhaust 241 from the housing 210 in a direction away from the rear surface 214.

Each of the rotational arms 222 and 224 may have one or more fins 217, 218 thereon, and each of the propulsion vessels 240 and 245 may have one or more fins 242*a-b*, 247*a-b* thereon. The rotational arms 222 and 224 may pass through the corresponding fin(s) 217, 218, but the fins 242*a* and 242*b* may be respectively on opposite upper and lower surfaces of the propulsion vessel 240, and the fins 247*a* and 247*b* may be respectively on opposite upper and lower surfaces of the propulsion vessel 245.

The design of the engine 200 may be less than ideal, however. For example, there is still room for improving the efficiency of such an engine.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to an engine, comprising a housing enclosing a manifold and having (i) an outer circumference and (ii) an inlet configured to receive an oxygen-containing gas, a first axle or shaft to which the housing is joined or fixed. a plurality of conduits or passages within and/or extending from the housing and to which the housing is joined or fixed, a plurality of combustion chambers at distal ends of the plurality of conduits or passages and external to the housing, a plurality of nozzles at distal ends of the plurality of combustion chambers, and a compressor in the manifold or upstream from the manifold or the inlet, comprising a plurality of fins or blades joined or fixed to the first axle or shaft or to a second axle or shaft colinear with the first axle or shaft. The manifold is in fluid communication with the inlet. The conduits or passages receive the oxygen-containing gas from the manifold. The combustion chambers are configured to receive the oxygen-containing gas from the conduits or passages and burn a fuel to heat at least some of the oxygen-containing gas. The nozzles are configured to (i) receive the heated oxygen-containing gas and combustion gases from the combustion chambers and (ii) direct the heated oxygen-containing gas and combustion gases exiting the nozzles in a predetermined direction. The compressor is configured to increase a pressure of the oxygen-containing gas at entrances of the conduits or passages.

In some embodiments, the housing may comprise first and second plates, separated by one or more dividers. For example, the engine may comprise a single divider having a center opening and a plurality of lateral openings, in which case the conduits or passages may comprise a plurality of rotary arms inserted into or affixed to the plurality of lateral openings (e.g., in a 1:1 relationship). Typically, the number of the lateral openings, the number of the rotary arms, the number of the combustion chambers, and the number of the nozzles are equal or the same.

In various embodiments, the first axle or shaft extends from the manifold and through the inlet. In such embodiments, the fins or blades may be joined or fixed to the first axle or shaft, and the first axle or shaft may further extend away from the inlet (e.g., towards another apparatus). Alternatively, the engine may further comprise the second axle or shaft, and the fins or blades may be joined or fixed to the second axle or shaft. In such embodiments, the engine may further comprise a differential 360a between the first axle or shaft and the second axle or shaft (see FIG. 11A), and the first and second axles or shafts may rotate at different rates.

Generally, the compressor includes n fins or blades, where n is a positive integer by which 360 can be divided to give an integer or a regular fraction. Similarly, the engine may comprise p rotary arms, p combustion chambers, and/or p nozzles, where p is a positive integer by which 360 can be divided to give an integer or a regular fraction. Thus, n and p can each independently be 2, 3, 4, 5, 6, 8, 9, 10, 12, etc., although the values of n and p and the resulting numbers of such components are not limited to these values.

In some embodiments, the compressor is in the manifold and has a diameter at its widest point of from 30 cm to 30 m. In such embodiments, the diameter of the compressor is generally less than the diameter of the center opening in the divider.

In various embodiments, the predetermined direction in which the nozzles direct the heated gases is perpendicular to a radius of the housing, or perpendicular to a direction that a corresponding one of the conduits or passages is joined or connected to the manifold. Alternatively, the predetermined direction may be along a tangent of a circle defined by the outermost periphery of the passages, conduits, or nozzles. In some further embodiments, each of the nozzles and each of the combustion chambers may have a maximum diameter that is equal to or less than an inner diameter of the rotary arms. In other or further embodiments, each of the combustion chambers has a front or nose facing a corresponding one of the conduits or passages with one or more openings therein configured to allow the oxygen-containing gas to pass into the combustion chamber.

The engine may further comprise a plurality of fuel supply lines configured to supply the fuel to the plurality of combustion chambers. In such embodiments, each of the combustion chambers may further comprise (i) a port and/or fuel inlet configured to receive the fuel from a corresponding one of the fuel supply lines and/or (ii) an igniter configured to ignite the fuel in the combustion chamber when the (compressed) oxygen-containing gas is in the combustion chamber. In some examples, the igniter is downstream from the port and/or fuel inlet. In other or further examples, each of the fuel supply lines has a width or diameter that is 1-20% of a corresponding diameter or width of the conduits or passages. In addition, the engine may further comprise a container (e.g., a tank or vessel) configured to store the fuel therein and/or a battery configured to provide an electrical charge to the igniters. The container and/or the battery may be external to the housing, and adjacent to the manifold. In embodiments including the battery, the engine may further comprise a wire (e.g., along and/or affixed or secured to a corresponding passage or conduit) carrying the electrical charge to a corresponding one of the igniters.

A further aspect of the present invention concerns an energy converter, comprising the present engine and an electricity generator. The electricity generator is communicatively coupled to the first axle or shaft or (when present) the second axle or shaft, and is configured to generate electricity from rotations of the first axle or shaft or the second axle or shaft (when coupled thereto).

A still further aspect of the present invention concerns a method of generating electricity, comprising passing the oxygen-containing gas through the present engine, burning the fuel in the plurality of combustion chambers, and transferring torque from the first axle or shaft to an electricity generator. Passing the oxygen-containing gas through the engine and/or burning the fuel causes the engine and at least the first axle or shaft to rotate, thereby generating the torque at or on the first axle or shaft. Transferring the torque to the electricity generator generates the electricity.

Another aspect of the present invention relates to an apparatus (e.g., an engine or rotary disk) comprising a housing enclosing a manifold, a first axle or shaft to which the housing is joined or fixed, a plurality of nozzles along or outside the outer circumference of the housing, a plurality of conduits or passages within and/or extending from the housing, and a compressor in the manifold. The housing includes an inlet configured to receive a fluid. The manifold is in fluid communication with the inlet. The conduits or passages carry the fluid from the manifold to the nozzles. The compressor comprises a plurality of fins or blades joined or fixed to the first axle or shaft or to a second axle or shaft colinear with the first axle or shaft. The compressor is configured to increase a pressure of the fluid at entrances of the conduits or passages.

In some embodiments, the inlet comprises a cylindrical section of the housing, with first and second openings at opposite ends of the cylindrical section. In other or further embodiments, the housing comprises first and second plates, separated by one or more dividers. The apparatus may include the same number of lateral openings in the divider as the number of rotary arms and nozzles in the apparatus.

In typical embodiments, the compressor includes n fins or blades, wherein n is a positive integer by which 360 can be divided to give an integer or a regular fraction, as described herein. The fins or blades may comprise a material having a minimum elastic modulus of 2.5 GPa.

In various embodiments, the compressor may have a height of from 10 cm to 10 m. Additionally or alternatively, the height of the compressor may be about 20-70% of that of the housing. The compressor may also have a diameter at its widest point of from 30 cm to 30 m, but the diameter of the compressor is generally less than the diameter of the center opening in the divider.

In embodiments in which the nozzles are along the outer circumference of the housing, each of the nozzles may have a central axis oriented at an angle of 0-45° to a tangent along the outer circumference of the housing at a location where the nozzle exits or emerges from the housing, or alternatively, where the fluid passes through the outer circumference of the housing. In other or further embodiments, each of the nozzles may have a length of from 2.5 cm to 100 cm and a diameter of from 2 cm to 2 m. Typically, however, each nozzle has a diameter that is equal to or less than the diameter of each of the rotary arms. In various embodiments, each of the rotary arms has a length of from 20 cm to 150 m, a diameter of from 2 cm to 2 m, and/or an arc of 45-90°.

The present invention advantageously increases the efficiency of energy transferred to and/or the torque generated at the axle or shaft, as well as the amount of electricity that can be generated from such an engine. These and other advantages of the present invention will become readily apparent from the detailed description of various embodiments below.

DETAILED DESCRIPTION

Figure 1A:
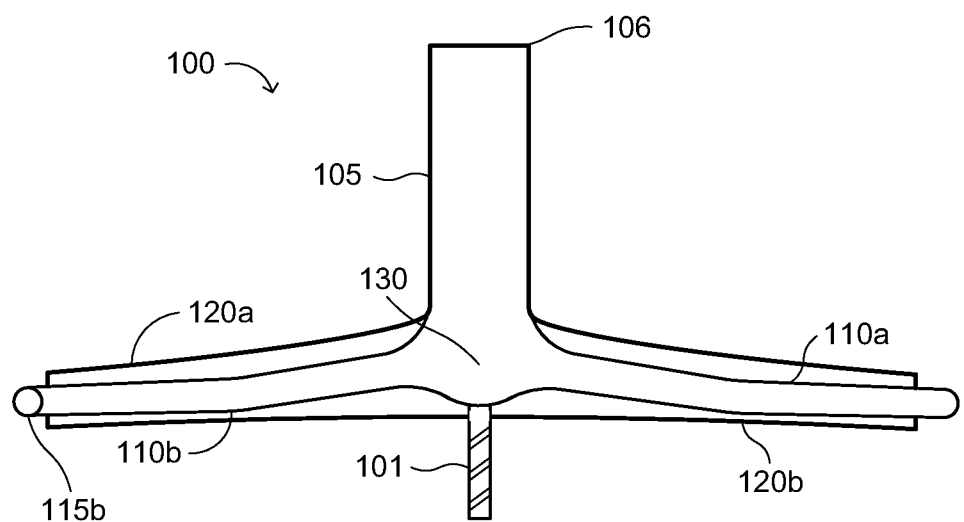
FIGS. 1A-B are diagrams showing an engine according to U.S. patent application Ser. No. 15/641,760, filed Jul. 5, 2017.
Figure 1B:
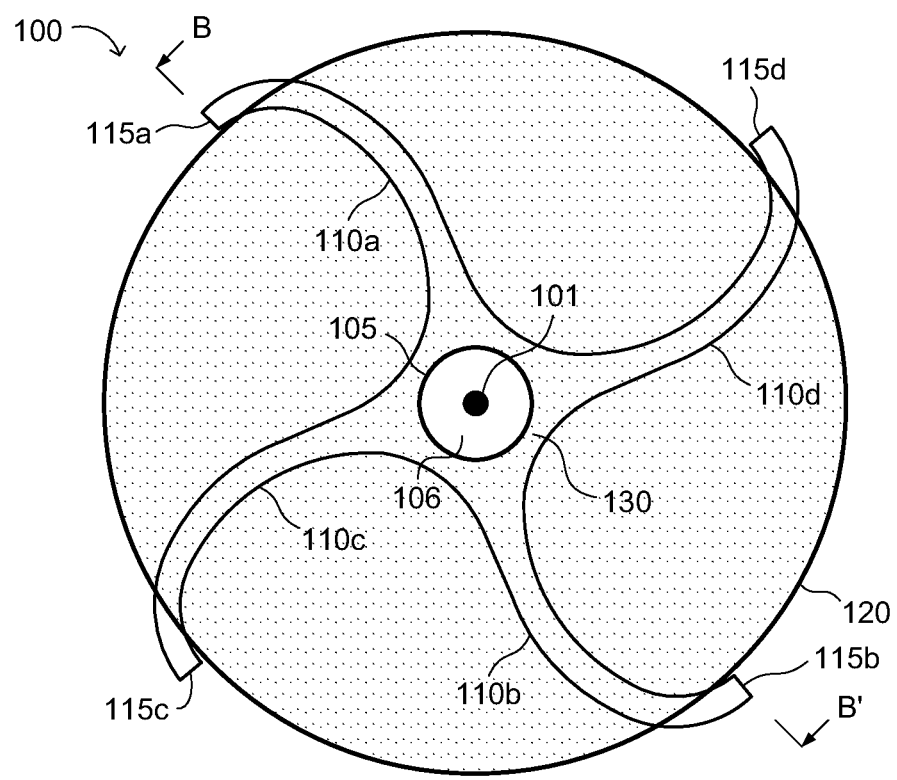
Figure 2A:
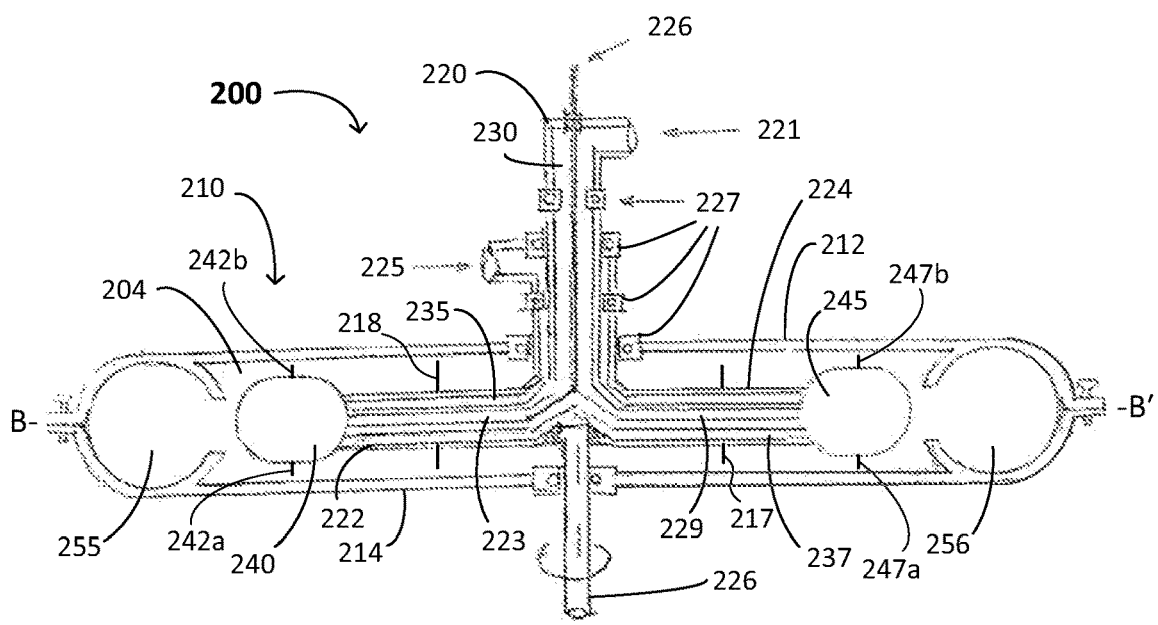
FIGS. 2A-B are a cross-sectional view and a top-down diagram of an exemplary engine according to U.S. patent application Ser. No. 14/508,898, filed Oct. 7, 2014.
Figure 2B:
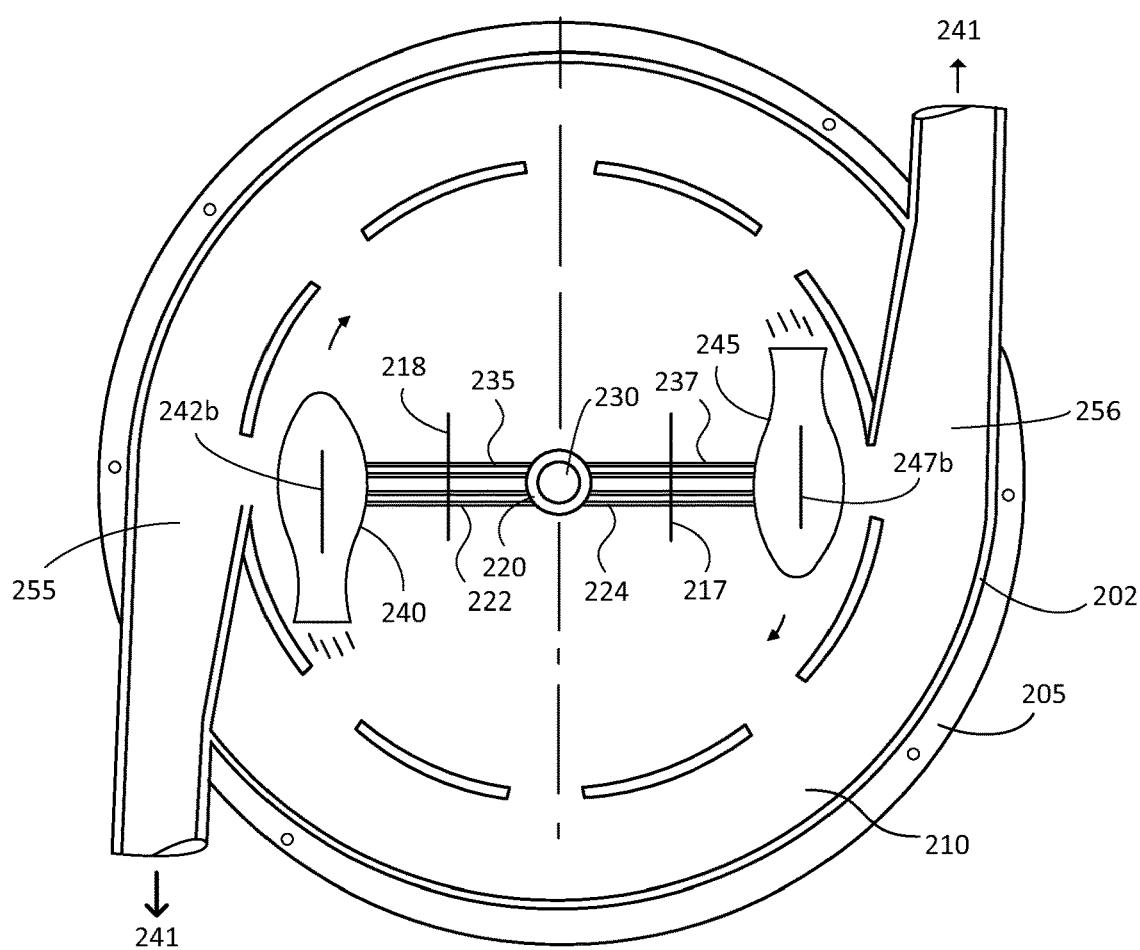

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

For the sake of convenience and simplicity, the terms "axle," "shaft," and "axis" are generally used interchangeably herein, but are generally given their art-recognized meanings. Also, for convenience and simplicity, the terms "connected to," "coupled with," "coupled to," "joined to," "attached to," "fixed to," "affixed to," "in communication with," and grammatical variations thereof may be used interchangeably, and refer to both direct and indirect connections, couplings, joints, attachments and communications (unless the context of its use unambiguously indicates otherwise), but these terms are also generally given their art-recognized meanings.

The terms "lower" and "upper" are used herein as convenient labels for the same or similar structures having a relative position to the other(s) as shown in the drawings, but which can change their relative position(s) depending on the orientation of the apparatus or other structure in the drawing(s). Similarly, the terms "downstream" and "upstream" are convenient labels for relative positions of two or more components of the apparatus/engine with respect to the flow of gas(es) within the apparatus/engine.

The present invention concerns an advanced version of the rotary jet disclosed in U.S. patent application Ser. No. 15/641,760, the relevant portions of which are incorporated herein by reference. The present engine further includes a device functioning as a compressor at or below the inlet. The compressor may be cone-shaped, and may comprise a plurality of fins or blades attached to a central or upper axle or shaft of the engine (e.g., at the uppermost and/or innermost surface or part of the cone, or of the fins or blades forming the cone). When the device or compressor rotates around the central or upper axle or shaft, the fluid (e.g., in the compressor) is forced outward through a relatively long rotary arm due to a centrifugal effect (e.g., centrifugal force). The fluid is ejected from the rotary arm(s) through a nozzle, which provides an additional rotational thrust or force, as in the rotary jet disclosed in U.S. patent application Ser. No. 15/641,760. The combination of the compressor, the centrifugal effect on the fluid in the rotary arms, and the rotational thrust or force from the fluid ejected through the nozzles causes the present engine to rotate at a higher rate than an otherwise identical engine that does not include the compressor.

In some embodiments, the engine may further include a windmill-type turbine fan connected to the central or upper axle or shaft (e.g., upstream from or in the inlet), although the invention is not limited to such a design. Furthermore, the central or upper axle or shaft may be connected to or unitary with a lower axle or shaft, thereby forming a single axle or shaft. In addition, either the upper or lower axle or shaft can be coupled to a generator to produce electricity or electrical power.

Most components of the engine (e.g., the inlet, housing, rotary arms, nozzles, divider, fins/blades) can be made from fiberglass, carbon fibers, or plastic (e.g., recycled or non-recycled polyethylene, polypropylene, polycarbonates, polyvinyl chloride, polystyrene, poly[methyl (meth)acrylate], copolymers and blends thereof, etc.), although for certain applications (e.g., when used in conjunction with a combustion chamber), metals such as aluminum, titanium, steel, etc. can be used. As a result, the cost of the present engine can be quite low, and significantly lower than alternative engines.

The invention, in its various aspects, will be explained in greater detail below with regard to exemplary embodiments.

Exemplary Rotary Disks with an Internal Compressor

In one aspect, the present invention relates to an engine (e.g., an engine) configured to convert fluid flow or fluid pressure to rotary kinetic motion or a different form of energy, comprising (a) a housing enclosing a manifold and having (i) an outer circumference and (ii) an inlet configured to receive a fluid, (b) an axle or shaft to which the housing is joined or fixed, (c) a plurality of nozzles along the outer circumference of the housing, (d) a plurality of conduits or passages within the housing, and (e) a compressor in the manifold. The manifold is in fluid communication with the inlet. The conduits or passages carry the fluid from the manifold to the nozzles, and the compressor is configured to increase a pressure of the fluid at entrances of the conduits or passages.

Figure 3A:
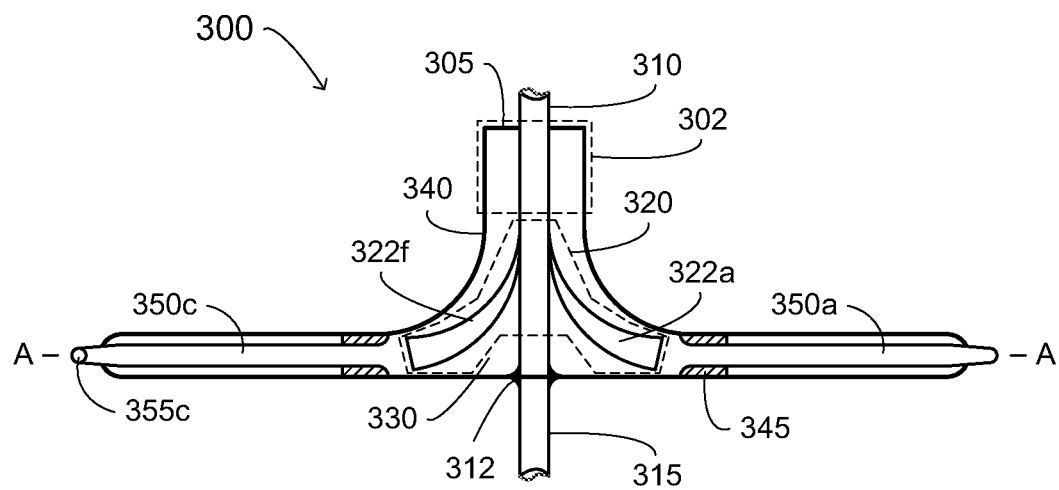
FIGS. 3A-B show an exemplary rotary disk according to one or more embodiments of the present invention.
Figure 3B:
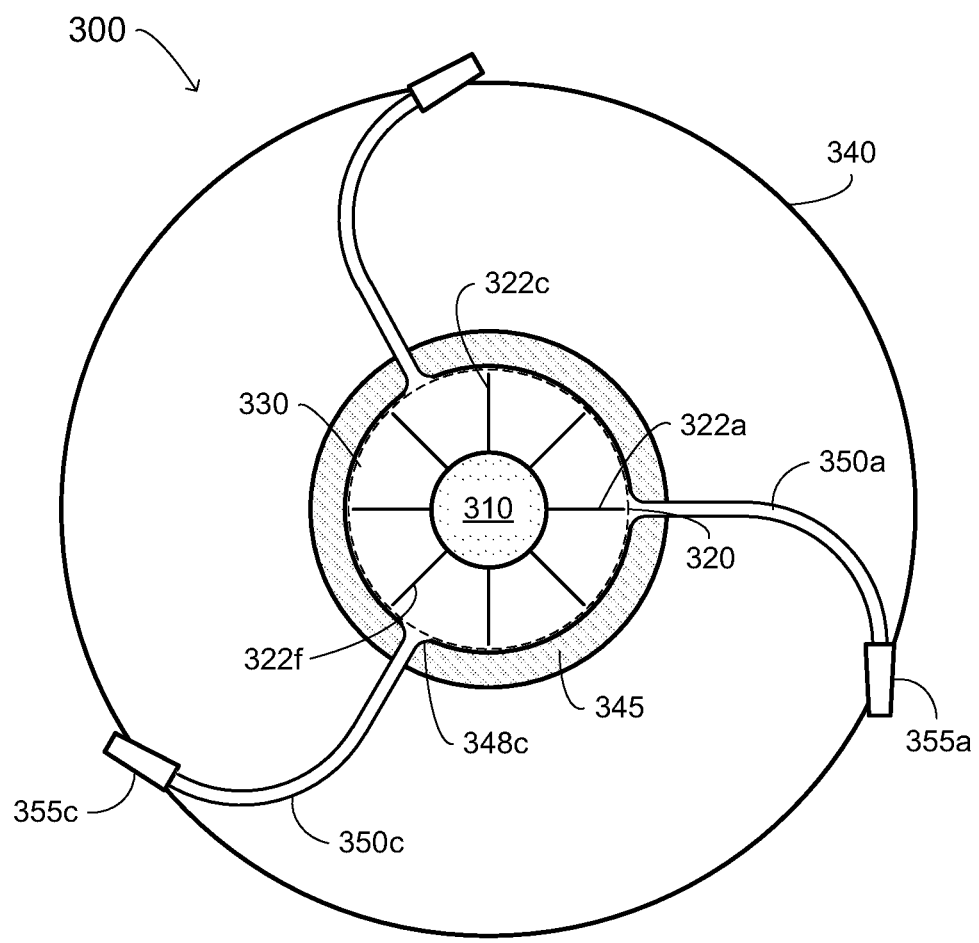

FIGS. 3A-B show a first exemplary embodiment of the present engine (e.g., rotary disk) 300, including an inlet 302 with an opening 305, a compressor 320 comprising a plurality of fins/blades 322a-h, an upper axle or shaft 310, a lower axle or shaft 315, a rotary disc and/or housing 340, a plurality of conduits (e.g., curved rotary arms) 350a-c, a divider 345, and a plurality of nozzles 355a-c. A fluid, such as air, exhaust and/or combustion gases, or water, enters the housing 340 through the opening 305. As the fluid passes through the housing 340 into the rotary arms 350a-c, then through the rotary arms 350a-c and out through the nozzles 355a-c, the housing 340 begins to rotate, as does the compressor 320. The centrifugal force provided by the rotating housing 340 and rotary arms 350a-c causes the fluid to move even more readily to the circumference of the housing 340 and out through the nozzles 355a-c, thereby providing a kind of amplifying effect to the rate of rotation of the housing 340 and rotary arms 350a-c.

Figure 11A:
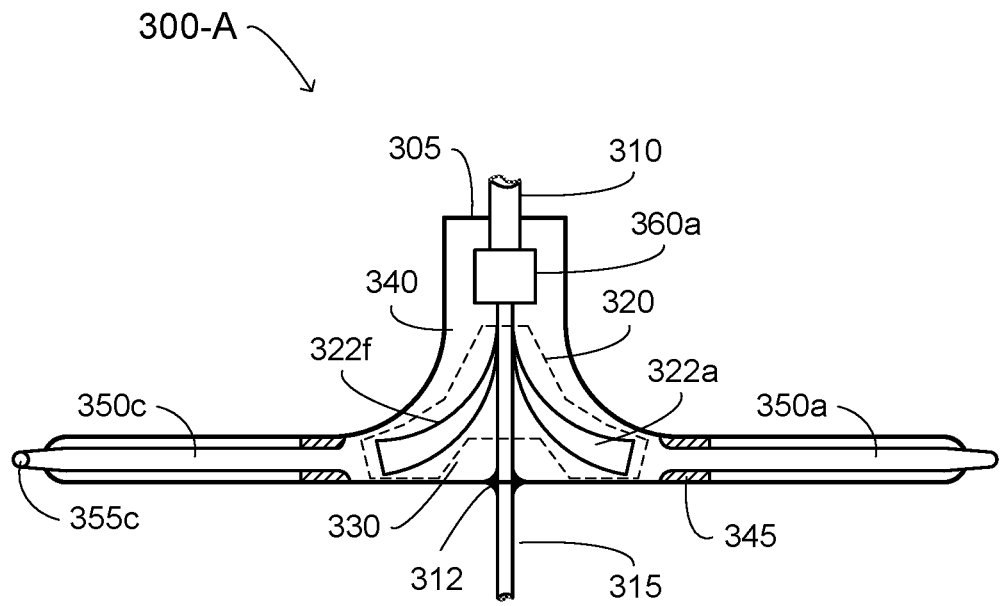
FIGS. 11A-B show exemplary rotary disks including a differential according to embodiments of the present invention.
Figure 11B:
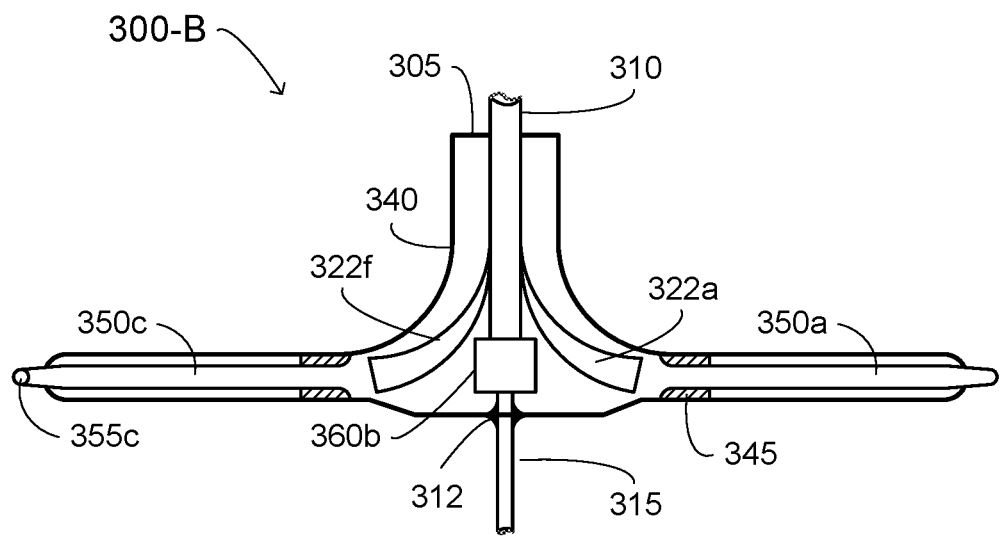

The upper axle or shaft 310 extends through the opening 305 of the housing 340, and the compressor 320 is joined to the upper axle or shaft 310. The lower axle or shaft 315 extends through the lower plate of the housing 340, and is joined to the lower plate of the housing 340 by a seal 312. The upper axle or shaft 310 and the lower axle or shaft 315 may be combined to form a single central axle or shaft as shown in FIG. 3A. Alternatively, the upper axle or shaft 310 and the lower axle or shaft 315 may be separated (e.g., in the space 330 below the compressor 320 and within the housing 340), in which case the upper and lower axles/shafts 310 and 315 may rotate at different speeds or rates. When the upper axle or shaft 310 and the lower axle or shaft 315 are separated, they may each further comprise a gear at an end of the axle or shaft facing the other axle or shaft, the gears on the different axles/shafts may have a gear ratio other than 1 (i.e., the gears may have a different number of teeth and/or a different diameter), and the engine 300 may further comprise a differential 360b between the gears of the upper and lower axles or shafts (FIG. 11B). Thus, in some embodiments, the upper axle or shaft 310 (and thus the compressor 320) may rotate at a rate that is m/n times the rate of rotation of the lower axle or shaft 315, where m and n are integers$\geq 1$, and m>n. In fact, in various embodiments (e.g., for electricity generation), one of the upper and lower axles or shafts 310 and 315 may be absent.

The upper and lower axles or shafts 310 and 315 may be cylindrical in shape, but are not limited to such a shape. For example, they may have a cross-section that is square, hexagonal, pentagonal octagonal, etc. The upper and lower axles or shafts 310 and 315 may have a diameter or width of from 2 cm to about 3 m, or any diameter or width (or range of diameters or widths) within this range, and a length of from about 50 cm to 100 m or more. The upper and lower axles or shafts 310 and 315 may comprise a metal or metal alloy, such as aluminum, steel, titanium, etc., a ceramic such as boron carbide, boron nitride, alumina, zirconia, etc., a plastic such as a polycarbonate, a polyacrylate, a polymethacrylate, polyvinylchloride (PVC), an epoxy resin, or other organic polymer, copolymer or polymer blend having a tensile modulus of at least 2.4 or 2.5 GPa, and combinations (e.g., coated or layered variations) thereof, etc.

The compressor 320 as shown in FIGS. 3A-B includes 8 fins/blades 322a-h, but the compressor 320 may include any positive integer number of fins/blades 322 that provides another positive integer when 360 is divided by it (e.g., 2, 4, 5, 6, 9, 10, 12, etc., which respectively give the positive integers 180, 90, 72, 60, 40, 36 and 30 when 360 is divided by it). In one or more embodiments, the number of fins/blades 322 equals a multiple of the number of rotary arms 350a-c.

Figure 5:
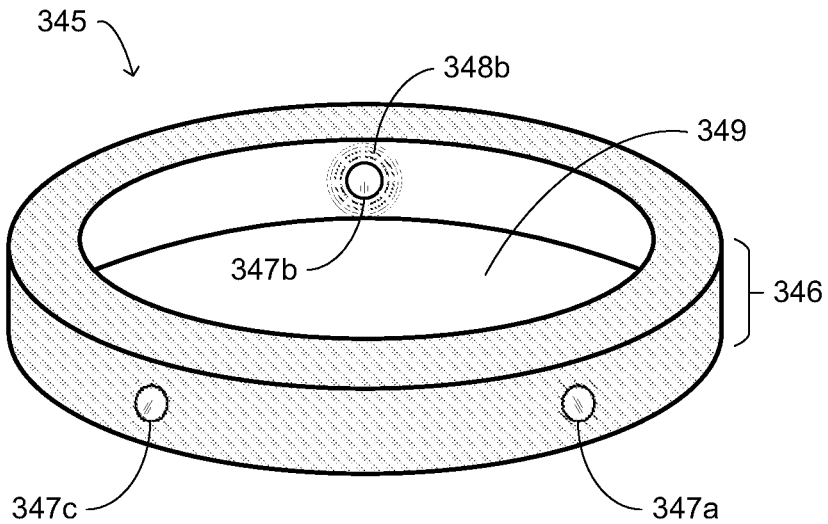
FIG. 5 shows an exemplary ring divider that is useful in the exemplary rotary disk of FIGS. 3A-B.

The diameter at the widest point of the compressor 320 may be, e.g., in the range from 30 cm to 30 m or more, but it is less than the diameter of the central opening 349 in the divider 345 (see, e.g., FIG. 5). The height of the compressor 320 (e.g., vertical distance from the lowermost tip of the fins/blades 322a-h to the uppermost point at which the fins/blades 322a-h contact the upper axle or shaft 310) may be in the range from 10 cm to 10 m or more, but it is less than the height of the housing 340 (e.g., the distance from the seal 312 connecting the lowermost wall of the housing 340 to the inlet 302), and is more typically about 20-70% of the height of the housing 340. The fins/blades 322a-h may comprise a material capable of moving a gas or liquid (e.g., air or water) from the inlet 302 of the housing 340 to the radial arms 350a-c without breaking. Such materials include metals and metal alloys such as aluminum, steel, titanium, nichrome allows, etc.; carbon, such as carbon fibers; fiberglass; plastics, as described herein; and combinations (e.g., laminates) thereof. The material(s) for the fins/blades 322a-h may have a minimum elastic modulus (e.g., Young's modulus) of 2.5 GPa, and in some cases, of 10, 20, or 100 GPa, or any other value that is greater than 2.5 GPa.

Figure 4A:
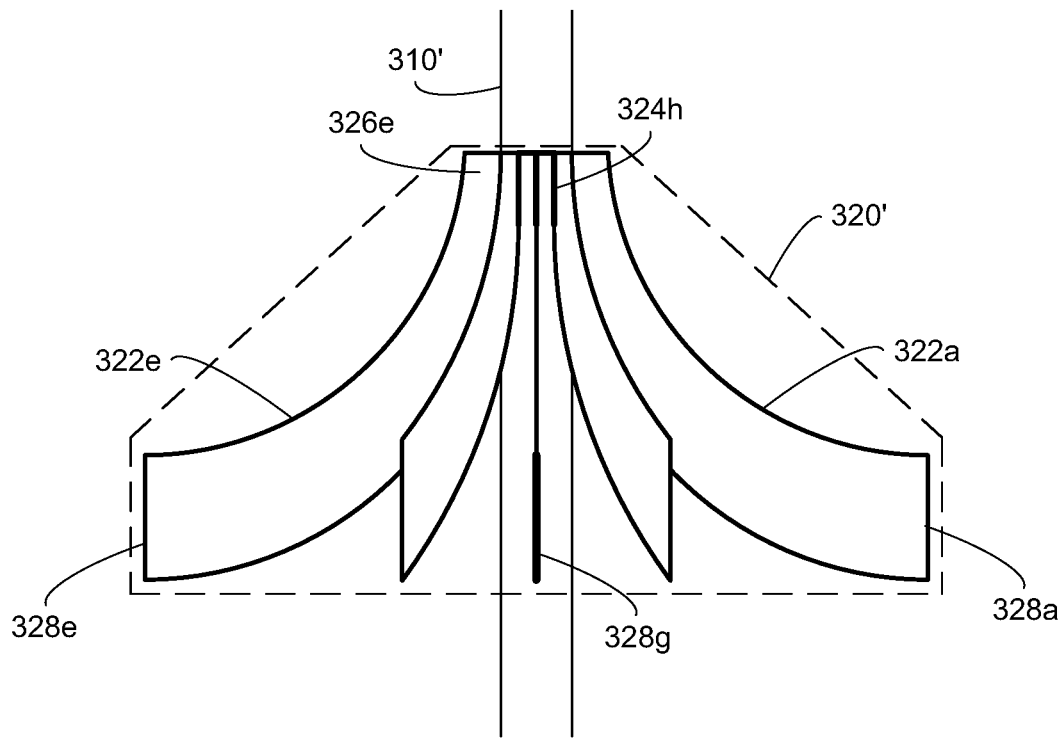
FIGS. 4A-D show various compressors that are useful in the exemplary rotary disk of FIGS. 3A-B.

The fins and/or blades 322a-h have a 3-dimensional shape that may curve or arc in one or more dimensions. FIG. 4A shows a side view of a variation of the compressor 320', attached or joined to the unitary central axle or shaft 310', but separate from the engine 300. The fins and/or blades 322a-h are joined to the central axle or shaft 310' along edges 324a-h, for example by one or more welds, adhesives, tongue-in-groove fittings, combinations thereof, etc., although the invention is not limited to such methods and/or mechanisms. For example, the fins and/or blades 322a-h may be joined to a ring or similar fitting at their respective inner edges 324a-h, and the ring/fitting (which circumscribes the axle or shaft 310') may be joined to the axle or shaft 310' by one or more welds, adhesives, screws, clamps, etc.

Figure 4B:
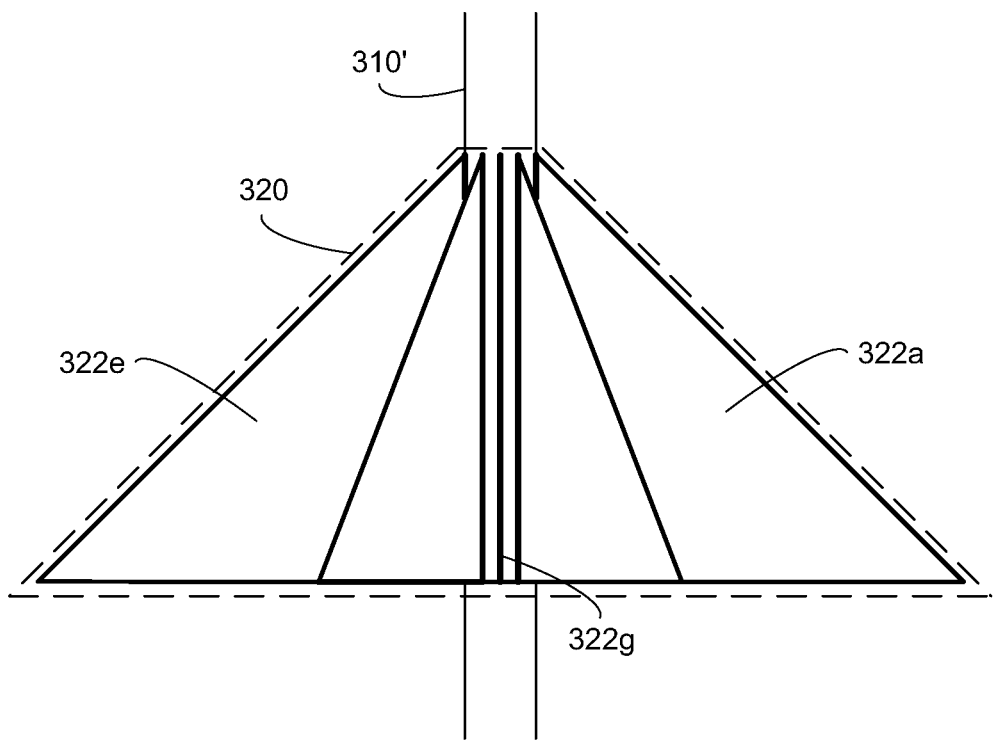
Figure 4C:
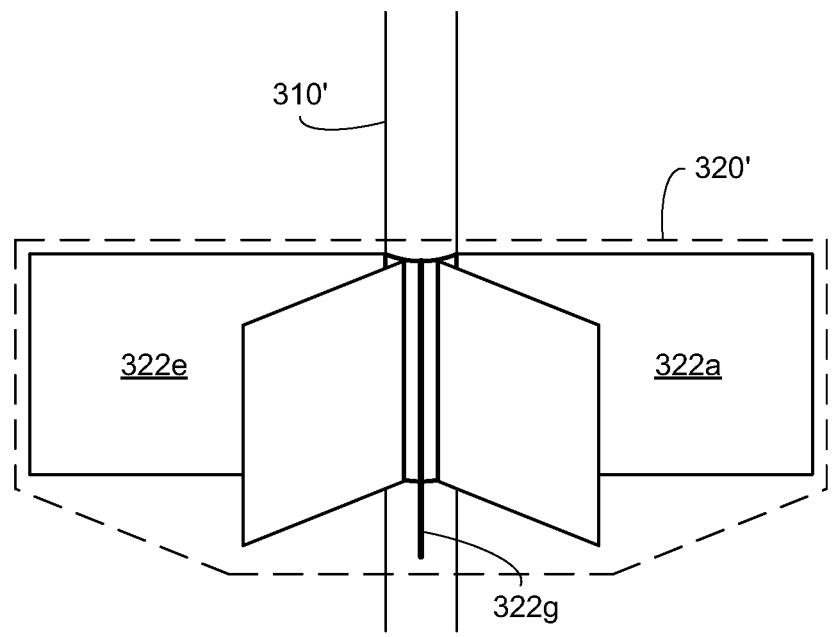
Figure 4D:
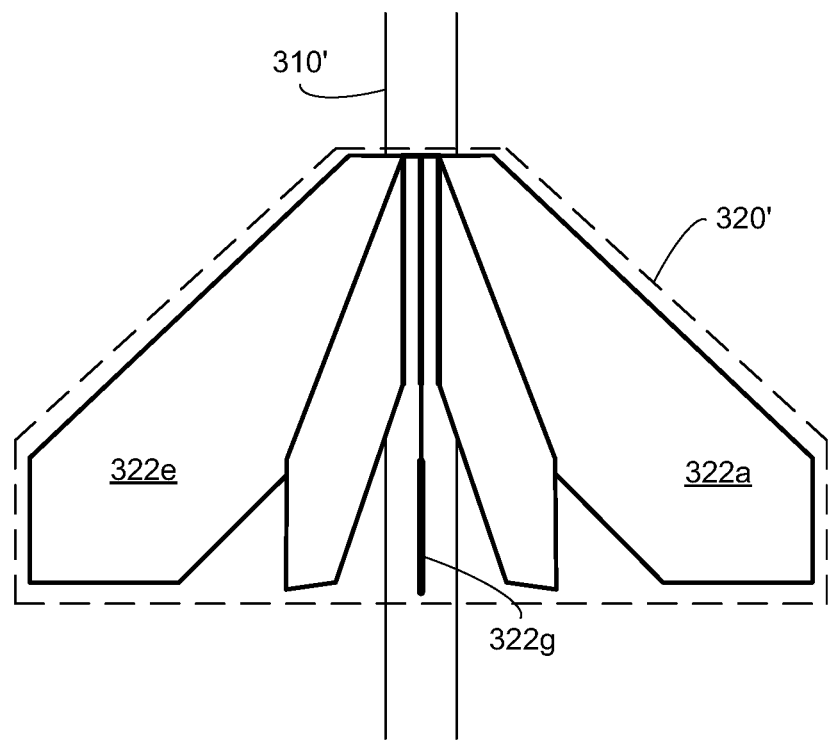

The fins and/or blades 322a-h may have an arc along the length of the blades of 45-90°, although the invention is not limited to this range. In fact, the invention is not limited to curved blades 322a-h. For example, the blades 322a-h may have a major surface that is triangular (FIG. 4B), trapezoidal, rectangular (FIG. 4C), hexagonal (regular or irregular; see FIG. 4D), or other shape. In further embodiments, the blades 322a-h may have one major surface side that is concave, and the opposite major surface is convex. In some embodiments, the compressor rotates in the same direction as the rotating arms 350a-c, and the convex side of the fins and/or blades 322a-h is the leading side during rotation of the compressor.

There are a number of different variations of the fins and/or blades. For example, the fins and/or blades may be planar or curved, and they may be angled (in part or in their entireties) and/or twisted (e.g., near the upper/central axle). In cases where the fins and/or blades are angled and/or twisted, the compressor may be punched-and-pressed from a single disc or sheet of metal (in which the fins and/or blades may be either curved or flat) or made from molded (e.g., injection-molded) plastic.

In embodiments in which the number of fins/blades 322 equals the number of rotary arms 350, the fins/blades 322 may have a shape that directs the fluid towards an opening of a corresponding rotary arm 350. In such embodiments, the corresponding rotary arm 350 is the rotary arm 350 having its opening nearest to the outermost edge or point of the fin/blade 322.

Referring back to FIG. 3A, a manifold or "cone" 330 houses the compressor 320. The manifold or cone 330 may be defined by upper and lower noncylindrical (e.g., cone-shaped or planar) plates or surfaces of the rotary disc and/or housing 340 and the inner surface of the divider 345. The manifold or cone 330 has dimensions slightly larger than those of the compressor 320. For example, the manifold or cone 330 may have a height and a diameter from 1 to 50%, or from 1 cm to 1 m, greater than the corresponding dimensions of the compressor 320, or any value or range of values therein, although the invention is not limited by these values. Alternatively, the spacing between the tips of the edges 328 of the fins and/or blades 322 (see, e.g., FIG. 3A) and the top and bottom inner surfaces of the housing 340 may be 1-20% of the length of the edges 328, or in absolute distances, 1-100 cm (or any value or range of values therein, although the invention is not limited by these values). In addition, the spacing between the edges 328 the fins and/or blades 322 and the innermost surface of the divider 345 may be 1-20% of the radius of the compressor 320, or in absolute distances, 10-50 cm (or any value or range of values therein, although the invention is not limited to these values).

The manifold or cone 330 can include an indentation in the lower surface of the housing 340 to reduce the volume of free space inside the housing 340. In addition, the space in the manifold or cone 330 as shown in FIG. 3A can be used to store fuel or a small battery, for example for an engine that further includes one or more combustion chambers to provide additional thrust (see, e.g., FIGS. 7A-B, FIG. 10 and the discussions thereof herein).

The housing 340 is fixed to the axle or shaft 315 by a seal or joint 312 (FIG. 3A). The seal or joint 312 fixes the housing 340 to the lower axle or shaft 315 (or unitary/central axle or shaft 310) and allows it to rotate with the lower axle or shaft 315 or central axle or shaft 310. A bearing (not shown) may be in the housing 340 at or adjacent to the inlet 302 that enables the position of the inlet 302 (e.g., the cylindrical portion of the housing 340) to be fixed. In such a case, the engine 300 may further comprise a second bearing that circumscribes the upper or central axle or shaft 310, between the upper or central axle or shaft 310 and a cap (not shown) on or over the inlet 302. The bearing(s) allow the housing 340 to rotate at a different rate than the upper or central axle or shaft 310 and may help to improve stability of the engine (e.g., rotary disk or engine) as it rotates, especially at high rates of rotation.

The rotary arms 350a-c may comprise a pipe, tube or other conduit, and may have a curved shape (e.g., an arc) in a plan or top-down view (e.g., FIG. 3B), although they may have straight portions or sections (e.g., adjacent to the manifold or cone 330 and/or the nozzle 355). The rotary arms 350*a-c* and the nozzles 355*a-c* are configured to eject the fluid partially or substantially tangentially to the circumference of the housing 340, thereby causing the rotary disk 300 to rotate. For example, the nozzles 355*a-c* may have a central axis oriented at an angle of 1-45° (or any angle or range of angles therein) to the tangent along the circumference of the housing 340 at the location where the nozzle 355 exits or emerges from the housing 340 (e.g., at the point where the nozzle axis crosses the housing circumference). In this manner, the nozzles 355*a-c* eject the fluid in a direction size that causes the rotary disk 300 to rotate away from the ejected fluid.

The rotary disk 300 may include any positive integer number of rotary arms 350 that provides another positive integer when 360 is divided by it (e.g., 2, 4, 5, 6, 9, 10, 12, etc., as described herein). However, in many cases, the number of fins/blades 322 is greater than the number of rotary arms 350.

The rotary arms 350*a-c* may have a length of from 20 cm to 200 m or more (or any length or range of lengths between 20 cm and 200 m), although the invention is not necessarily limited to this range. In electrical power producing applications, the rotary arms 350*a-c* preferably have a length providing the rotary disk 300 with a diameter of at least 100 meters (e.g., 200-250 meters, or any diameter or range of diameters of at least 100 meters). The rotary arms 350*a-c* may also have a diameter of from 2 cm to 3 m or more (or any diameter or range of diameters between 2 and 300 cm), although the invention is not necessarily limited to this range, either. The arc in the rotary arms 350*a-c* may be from 45-90°, or any value or range of values therein, but the invention is not necessarily limited to this range. In fact, the rotary arms 355 may not have a curve or arc at all, but instead, may comprise a series of angled, linear or substantially linear conduit sections that result in a nozzle angle as described herein.

Both the rotary arms 350*a-c* and the nozzles 355*a-c* may be or comprise one or more materials such as metals and metal alloys, ceramics (e.g., high-impact or shatterproof ceramics), high-modulus plastics (e.g., having a minimum elastic modulus of 2.5 GPa), and combinations (e.g., laminates) thereof, as described herein. The nozzles 355*a-c* may be joined to the rotary arms 350*a-c* by welding, adhering (e.g., with glue or another adhesive), clamping, use of one or more fittings (e.g., tongue-in-groove fittings, such as those found in conventional luer lock fittings, twist-on or screw-on fittings), etc., or may be formed integrally with the corresponding rotary arm 350.

The nozzles 355*a-c* may have a length of from 2.5 cm to 200 cm (or any value or range of values therein) and a diameter of from 2 cm to 3 m (or any diameter or range of diameters between 2 and 300 cm), although the diameter of the nozzles 355*a-c* is generally equal to or less than that of the rotary arms 350*a-c*. Also, in general, each of the rotary arms 350*a-c* are identical to each other (e.g., they have the same dimensions and comprise the same materials), and each of the nozzles 355*a-c* are identical to each other. The nozzles 355*a-c* may independently comprise any of the materials described herein for the rotary arms 350*a-c*, although the nozzles 355*a-c* may not necessarily comprise the same material(s) as the rotary arms 350*a-c*.

FIG. 5 shows a perspective view of the divider 345. The divider comprises a cylinder 346, with a center opening 349 and three openings 347*a-c* therethrough for insertion/attachment of the rotary arms 350*a-c*. The openings 347*a-c* are spaced 120° apart, although when there is a different number of rotary arms (e.g., n rotary arms 350*a-c*), there is an equal number of openings 347*a-c*, and the openings 347*a-c* are spaced (360/n)° apart.

The cylinder 346 in the divider 345 may have a height equal to the internal spacing between the upper and lower plates of the housing 340 at the location where the rotary arms 350 are connected to the manifold or cone 330. For example, the cylinder 346 may have a height of 2-250 cm, or any value or range of values therein. The center opening 349 has a diameter greater than that of the compressor 320 at its widest point (i.e., its greatest width or diameter). The divider 345 may comprise a metal, metal alloy, ceramic or a polymer, as discussed herein, but the polymer may also include lower-modulus (e.g., compressible) materials such as latex rubber, a silicone rubber, an acrylonitrile-butadiene-styrene (ABS) rubber, etc., in which case the divider 345 may be formed by molding (e.g., injection molding).

The openings 347*a-c* correspond to the rotary arms 350*a-c*, and the rotary arms 350*a-c* are fixed in the openings 347*a-c* by insertion, adhesion, screwing (e.g., using a spiral or threaded tongue-in-groove fitting), etc. Thus, each of the rotary arms 350*a-c* may have an outer diameter at the location where it is joined to the corresponding opening 347*a-c* equal to the diameter of the corresponding opening 347*a-c*. To facilitate fluid flow and/or reduce fluid turbulence in the manifold or cone 330, each opening 347*a-c* may be surrounded on the inner surface of the cylinder 346 by a curved recess 348*a-c* (only recess 348*b* is shown in FIG. 5; see FIG. 3B for a top-down, cross-sectional view of the recesses 348*a-c*).

The rotary disk 300 (FIGS. 3A-B) receives the fluid through the inlet 302. The fluid may comprise water (e.g., from a lake, river, natural or man-made reservoir, storage tank, etc.), air (e.g., wind), heated air and combustion gas (e.g., from a combustion chamber upstream from and in fluid communication with the inlet 302), etc. Pressure on/in the fluid at or in the inlet 302 (and/or upstream from the inlet 302) forces the fluid through the manifold/cone 330, into the rotary arms 350 and out from the nozzles 355. The force of the fluid exiting from the nozzles 350 (e.g., on the fluid in the environment surrounding the rotary disk 300) causes the rotary disk 300 to rotate, in turn causing the compressor 320 (joined to the housing 340 of the rotary disk 300 through the lower axle/shaft 315 or central axle/shaft 310 and the seal 312) to rotate, increasing the pressure on the fluid entering the rotary arms 350. As the rotary disk 300 rotates, the centrifugal force on the fluid in the rotary arms 350 increases, causing the force from the fluid exiting the nozzles 355 to increase, in turn increasing the rotation rate of the rotary disk 300 and the compressor 320, providing a kind of "self-amplifying" effect on the rotation rate of the rotary disk 300, and thus, the torque on the upper or central axle/shaft 310 by the rotary disk 300 and the kinetic/mechanical energy transferred from the rotary disk 300.

Figure 6:
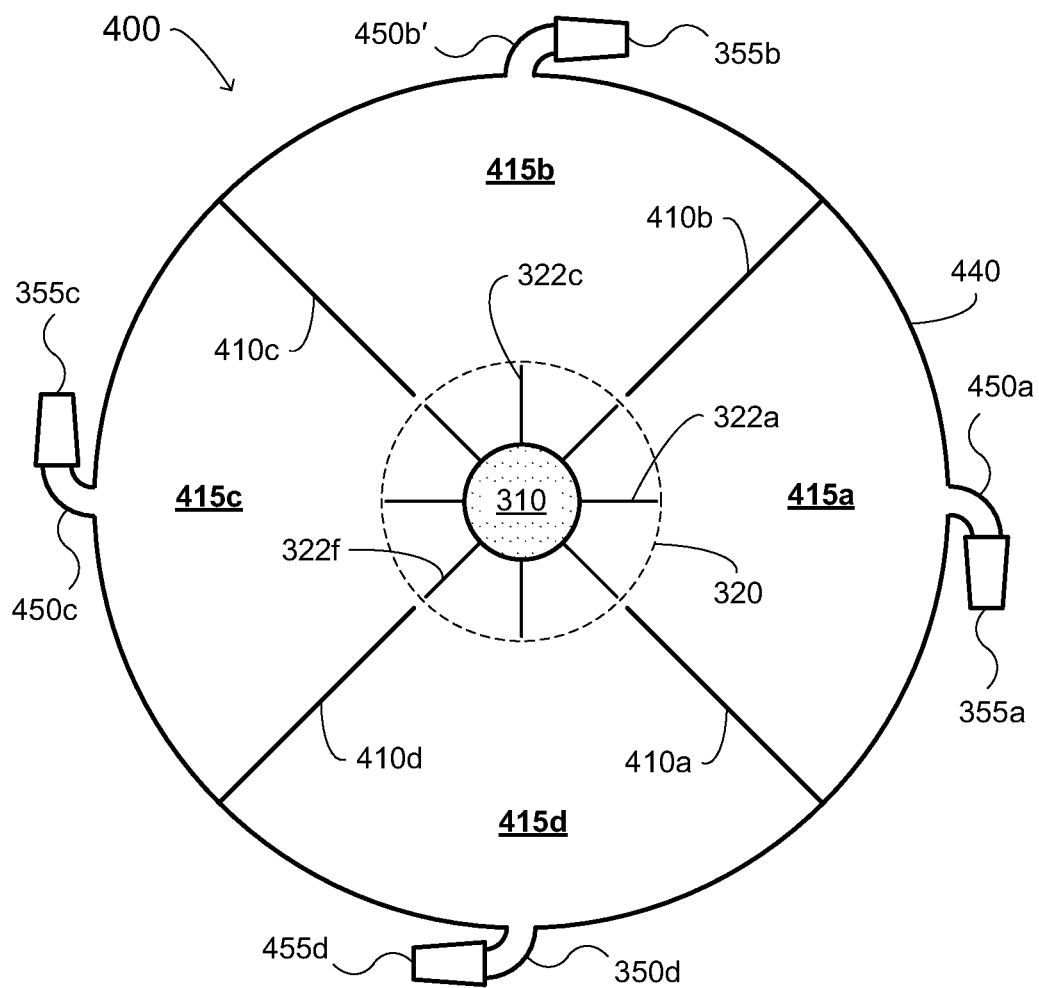
FIG. 6 shows an exemplary alternative engine (e.g., rotary disk) according to one or more further embodiments of the present invention.

FIG. 6 shows an alternative rotary disk 400, in which the rotary arms in the rotary disk 400 (FIGS. 3A-B) are replaced with radial dividers 410*a-d* in an otherwise open housing 440. The nozzles 355*a-d* correspond to each section 415*a-d* in the disk housing 440. Each divider 410*a-d* is not necessarily equidistant from two adjacent nozzles 355. For example, a divider 410 may be closer to the corresponding nozzle 355 (e.g., divider 410*a* may be adjacent to nozzle 355*a*, or alternatively, to nozzle 355*b*). Each nozzle 355*a-d* may be connected to the housing 440 by a corresponding curved tube or conduit 450*a-d*. Accordingly, each nozzle 355*a-d* may have a central axis oriented at an angle of 0-45° (or any angle or range of angles therein) to the tangent along the outer circumference of the housing 440 at the location where the fluid passes through the circumference of the housing 440. The compressor 320 is substantially the same as that in FIGS. 3A-B.

Figure 7A:
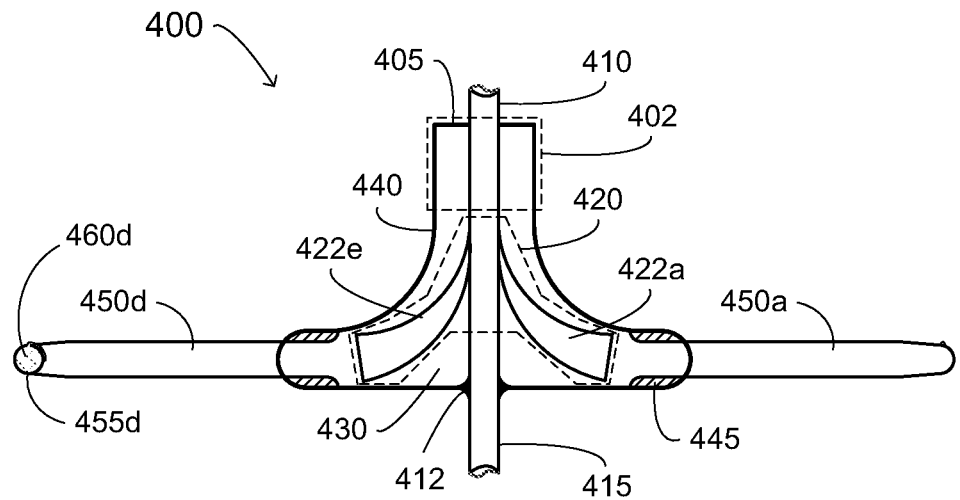
FIGS. 7A-B show an exemplary engine including combustion chambers at ends of rotary arms according to one or more alternative embodiments of the present invention.
Figure 7B:
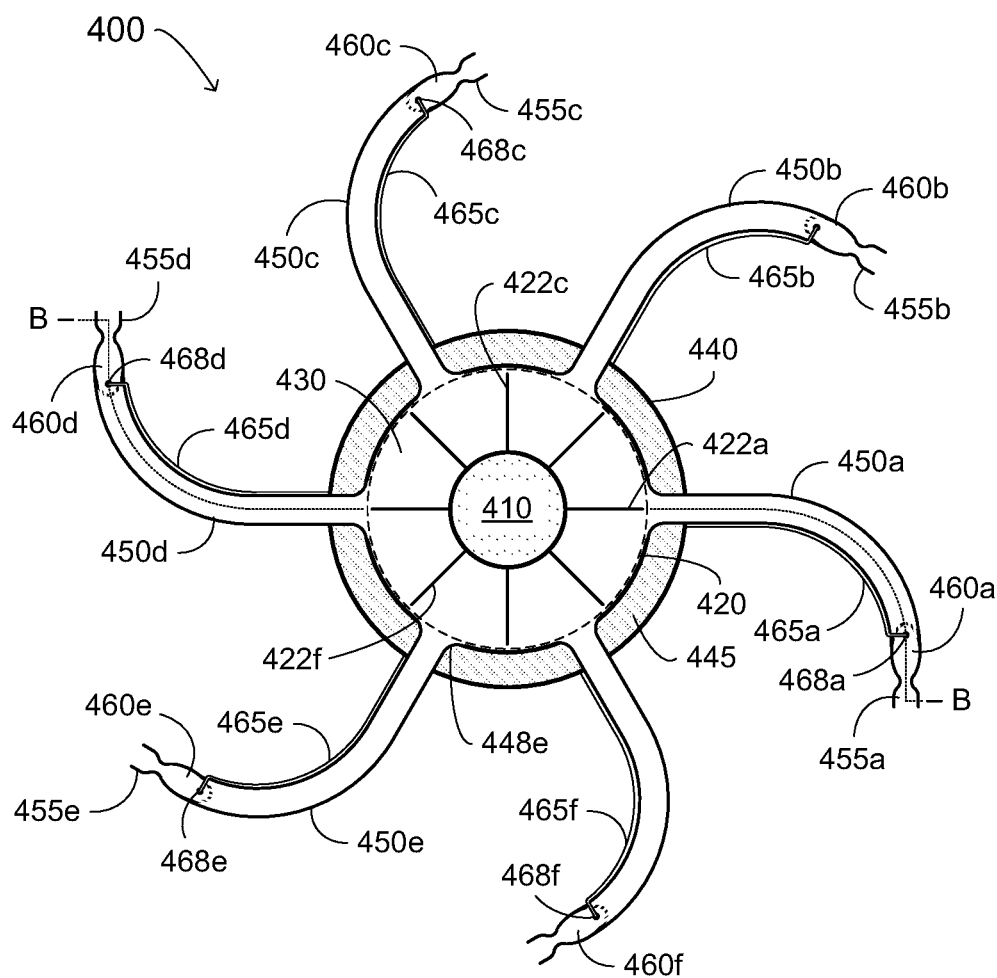

Exemplary Engines with One or More Compressors, Including an Internal Compressor FIGS. 7A-B show an exemplary engine 400 with an internal compressor 420. FIG. 7A is a cross-sectional view of the exemplary engine 400 in FIG. 7B along the line B-B. The engine 400 comprises a rotary disk similar or identical to the rotary disk 300 in FIGS. 3A-B and a plurality of combustion chambers 460a-f. Each combustion chamber 460a-f is between a corresponding rotary arm 450a-f and a corresponding nozzle 455a-f. The internal compressor 420 is essentially the same as the compressor 320 in the rotary disk 300 of FIGS. 3A-B, and the divider 445 is essentially the same as the divider 345 in FIG. 6 and/or in the rotary disk 300 of FIGS. 3A-B. The upper and lower axles or shafts 410 and 415 (or the combined central axle or shaft) are also essentially the same as the upper and lower axles or shafts 310 and 315 (and the combined central axle or shaft) in FIGS. 3A-B.

The housing 440 may be similar to or essentially the same as the housing 340 in FIGS. 3A-B, although the housing 440 as shown in FIGS. 7A-B has an outer circumference proximate or adjacent to the outer surface of the divider 445. Thus, the outer surface of the divider 445 may have a shape complementary to that of the periphery and/or circumference of the housing 440. Also, the rotary arms 450a-f may extend from the periphery and/or circumference of the housing 440, in addition to the outer surface of the divider 445. In some cases, the divider 445 may not be necessary.

Referring now to FIG. 7B, each of the rotary arms 450a-f has a combustion chamber 460a-f at a distal end thereof. The nozzles 455a-f are respectively at the exhaust or output end of the respective combustion chambers 460a-f. Air or other combustion gas (e.g., oxygen, oxygen-rich air, a mixture of nitrogen and oxygen [e.g., scuba nitrox], ozone, a nitrogen oxide such as NO or $NO_2$, mixtures thereof, etc.) enters the combustion chambers 460a-f through holes in the nose of the combustion chambers 460a-f Alternatively, each of the combustion chambers 460a-f may have a single opening (e.g., an inlet or entrance) in the upstream end thereof, as long as there is some kind of constriction or partial closure at the entrance of the combustion chamber 460a-f. Fuel is supplied to the combustion chambers 460a-f through fuel supply lines 465a-f.

Figure 8A:
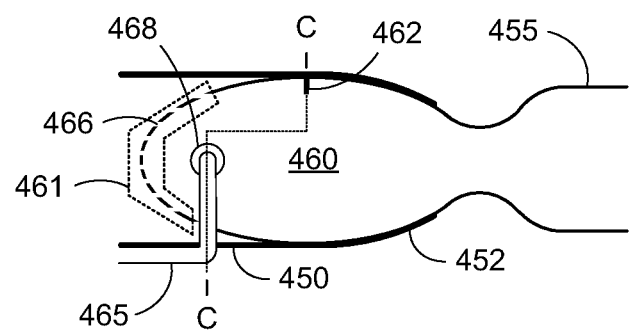
FIGS. 8A-B show plan and end-on views of an exemplary combustion chamber that is useful in the exemplary engine of FIGS. 7A-B.

FIG. 8A shows a top-down, cross-sectional view of the distal end of the exemplary rotary arm 450, the exemplary combustion chamber 460, and the exemplary nozzle 455. The combustion chamber 460 may have an oval, circular, egg-shaped or bullet-shaped cross-section, although the invention is not limited to such shapes. The combustion chamber 460 may also have a diameter (e.g., an outer diameter) or width equal to a diameter (e.g., an inner diameter) of the rotary arm 450. To secure the combustion chamber 460 in the rotary arm 450, the rotary arm 450 may have a conical or narrowed section 452 at the distal end. For example, the conical or narrowed section 452 may have a diameter that decreases from the diameter of the rotary arm 450 to 20-80% of the diameter of the rotary arm 450, although the invention is not limited to this range. The conical or narrowed section 452 may conform to the outer shape of the combustion chamber 460, but it is not required to do so.

Figure 8B:
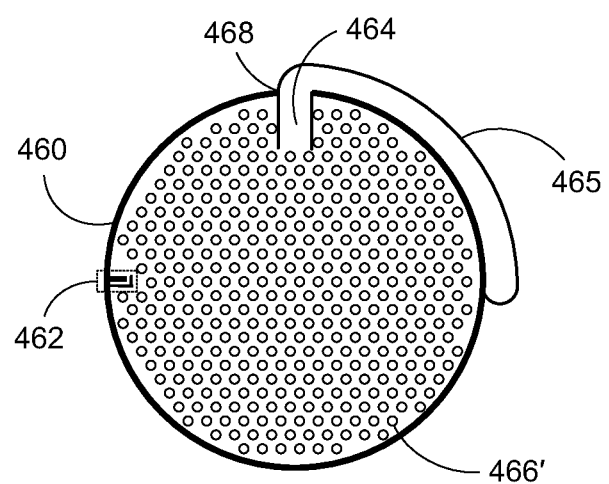

The combustion chamber 460 may have a front or nose 461 with holes or inlets 466 therein. Alternatively, the front or nose 461 of the combustion chamber 460 may have a single opening, and comprise a constriction or narrowing in the rotary arm 450. FIG. 8B is, in part, an end-on view of the front or nose 461 of the combustion chamber 460 and, in part, a cross-sectional view of the combustion chamber 460 along the line C-C in FIG. 8A. In the embodiment shown in FIG. 8B, multiple small holes/openings 466' allow compressed air or other oxygen-containing gas to enter the combustion chamber 460 somewhat freely, although in the absence of combustion, the pressure of the gas in the combustion chamber 460 is less than the pressure of the gas in the rotary arm 450 just before the front or nose 461.

Fuel is supplied to the combustion chamber 460 by the fuel supply line 465 through an inlet 464. In a further embodiment, the inlet 464 may have a constriction therein (not shown). The inlet 464 may pass through a port 468 in the wall of the combustion chamber 460. The fuel supply line 465 and the inlet 464 may have a diameter or width much less than the diameter or width of the rotary arm 450. For example, the diameter or width of the fuel supply line 465 may be 1-20% of the diameter or width of the rotary arm 450, or any percentage or range of percentages therein, but the invention is not limited to this range. Given the gas compression caused by the centrifugal force of the rotating rotary arms 450 and the force with which the gas emerges from the nozzles 450 in the absence of any combustion, it is understood that the additional force and/or thrust provided by combustion in the combustion chambers 460 increases dramatically, even when very little fuel is burned. Also, the fuel is also compressed, pressurized and/or accelerated by centrifugal force, as the fuel supply line 465 runs along and/or is affixed to the rotary arm 450. The fuel may be any combustible material, but in various embodiments, it may comprise a combustible material that is in the gas phase at ambient temperature (e.g., 18-25° C.), such as methane, propane or butane, or that is in the liquid phase at ambient temperature, such as gasoline, diesel fuel, kerosene, jet fuel, methanol, ethanol, mixtures thereof, etc. The fuel may be delivered continuously or in short "pulses" (e.g., discrete amounts of 10 µg-1 g, every 100 msec-5 sec, or any mass or range of masses therein, at any frequency or range of frequencies therein, although the invention is not limited to such values), but in general, the larger the amount of fuel supplied during such a "pulse," the less frequently the fuel is supplied.

An ignition source (e.g., a spark plug or other gap between electrical conductors) 462 may ignite the mixture of fuel and oxygen-containing gas (e.g., air) in the combustion chamber 460. An electrical wire (not shown) affixed to the outside of the rotary arm 450 and the housing 440 may provide an electrical charge to the ignition source 462. However, in some embodiments, the fuel may auto-ignite or auto-detonate after a relatively small number of ignition cycles (e.g., 1-5), when the combustion chamber 460 gets sufficiently hot. The placement of the ignition source 462 in the combustion chamber 460 is not particularly critical, but in some embodiments, the ignition source 462 is between the inlet 464 and the nozzle 455 (e.g., 10-50% of the distance from the inlet 464 to the nozzle 455). In some embodiments, the ignition source 462 may also be at a location where the wall of the combustion chamber 460 contacts the wall of the rotary arm 450.

Torque is proportional to the product of a force causing rotation of a rotor (e.g., the force applied by the gases exiting the nozzles 455a-f onto the rotary arms 450a-f) and the radius of the rotor. In the exemplary engine 400, when the radius of the engine 400 (i.e., the distance from the center of the axle/shaft 410/415 to the end of each nozzle 455a-f) exceeds a relatively high threshold (e.g., 100 meters), a relatively small amount of fuel along with a relatively highly compressed air supply (e.g., at a pressure of 5 atm or more at the entrances to the rotary arms 450a-f) generates significantly more torque than a smaller, but otherwise identical, system (e.g., using 50-100% more fuel, a pressure of 3 atm or less at the entrances to the rotary arms 450a-f, and a radius of less than 50 m). Therefore, the length of the rotary arms 450a-f plays a very important role, because the centrifugal force applied to the gas in the rotary arms 450a-f is directly proportional to the radius of the engine 400 when the engine 400 rotates. Therefore, when the rotary arms have a relatively large length (and the engine 400 has a relatively large radius), the gas in the rotary arms 450a-f at the end of the arm is under great pressure because of centrifugal force, even at relatively low rotational rates. The longer the arm/radius, the denser the compressed gas. The rotary arms 450a-f can be constructed with light-weight and strong materials, such as those used to make blades for wind turbines (e.g., glass fiber- and/or carbon fiber-reinforced polymer resins, such as polyesters, epoxy resins, etc.). Similar to large-radius wind turbines, the present engine can provide mechanical force, energy or power for a megawatt power plant when the radius is sufficiently large (e.g., at least 100 meters). Given that the power output by the present engine increases exponentially with an increase in the radius of the rotary disk, a rotary arm length of at least 80 m (e.g., 100-150 m, or any other length or range of lengths of at least 80 m) is preferred for electricity generation. Such arm lengths are believed to be able to provide gas pressures of 60-80 atm or more in the rotary arms at the end of the arms, immediately before the nozzles, even at relatively low rates of rotation.

Figure 9:
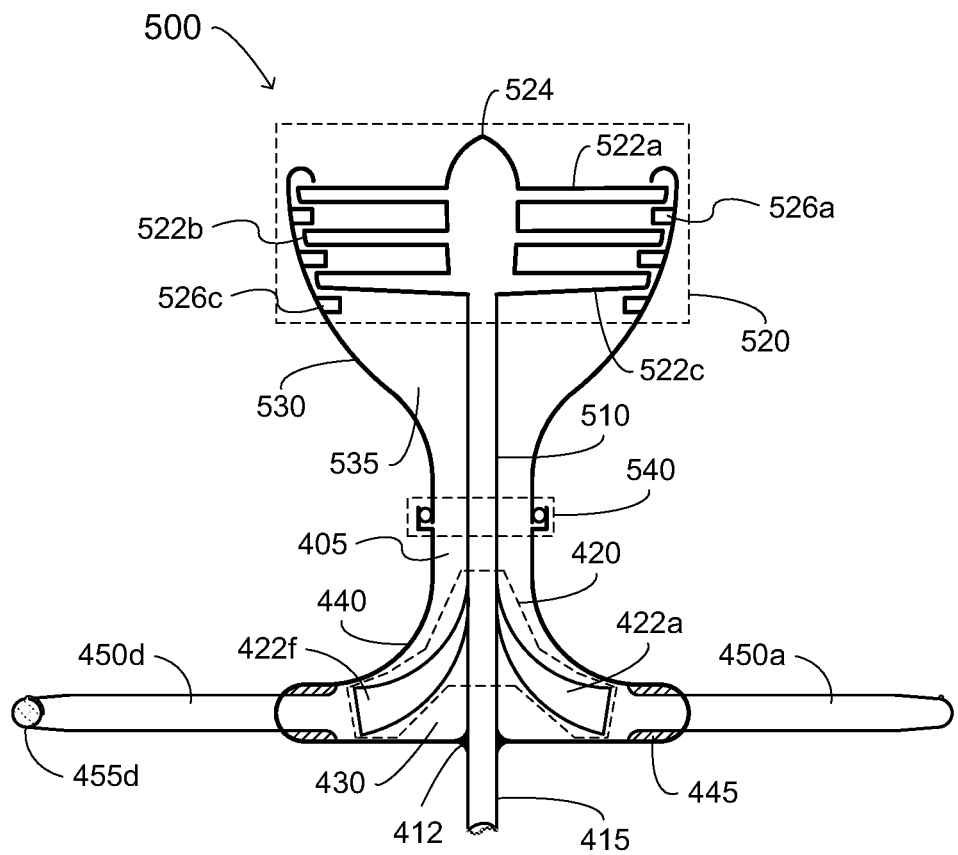
FIG. 9 shows an exemplary engine including combustion chambers and a turbine compressor according to one or more embodiments of the present invention.

FIG. 9 shows an exemplary engine 500 with an internal compressor 420 and a second (e.g., turbine) compressor 520. The engine 500 comprises the exemplary engine 400 in FIGS. 7A-B and a turbine comprising the second compressor 520 and a housing 530 that contains or houses the second compressor 520. The housing 530 is fixed (i.e., it does not rotate), and is joined to the rotary disk housing 440 by a bearing 540. Thus, the interior 535 of the housing 530 is in fluid communication with the inlet 405 of the engine 400.

The second compressor 520 comprises a plurality of turbine fans 522a-c affixed to a central cone 524. The central cone 524 is colinear with the upper (or central) axle or shaft 510. Alternatively, the turbine fans 522a-c may be affixed to the upper (or central) axle or shaft 510. As a result, the turbine fans 522a-c rotate about the cone 524 and/or the axle or shaft 510. The compressor 520 further comprises a plurality of rings or constrictions 526a-c, configured to inhibit or prevent backflow of compressed gas from the interior 535 of the turbine compressor housing 530.

During operation, the compressed gas from the interior 535 of the housing 530 flows to the internal compressor 420 through the inlet 405, then is further compressed by the internal compressor 420 as it flows into the rotary arms 450a-f. An additional centrifugal force is applied to the compressed gas by the rotation of the rotary arms 450a-f, and the compressed, pressurized gas and fuel are mixed or combined in the combustion chamber 460a-f, where the fuel is ignited to heat the compressed, pressurized gas, causing the compressed, pressurized gas to rapidly expand as it exits the nozzles 455a-f. as a result, burning a relatively small amount of fuel can cause a relatively large increase in the rotation rate of the rotary disk 400, as compared to the rotation rate of the rotary disk 400 in the absence of the combustion chambers 460a-f.

In some applications, the rotary arms 450a-f may have a shape like a propeller (e.g., each rotary arm 450a-f may have first and second fins on opposite sides of the rotary arm 450a-f configured to provide a thrust in air when the rotary arm rotates), to provide thrust for aeronautic and/or aviation purposes. Such a design may be useful in a helicopter, airplane, or drone, for example.

The combustion chambers may be sufficiently cooled simply by rotating or spinning in the air. However, if necessary or desired, the combustion chambers may be cooled by coils (e.g., metal tubes or conduits) around the combustion chambers that carry or transport water. When the water inside the coil around a particular chamber becomes sufficiently hot to vaporize, the steam/water vapor can then be directed to the exhaust from the corresponding nozzle to add more mass to the thrust from the heated gas exiting the nozzle.

Conventional jet engines typically have four major components: one or more air compressors, one or more combustion chambers, one or more turbines and an exhaust system. The majority of the energy from fuel consumption/combustion is consumed by driving the turbine blades, and the remainder of the energy to propel the jet. Fuel efficiency may be compromised as a result. In the present invention, the centrifugal force of the rotating rotary disk provides efficient air compression. The nozzles may also provide an important function. For example, when the exhaust gases exit the nozzle in a direction perpendicular to the radius of the rotary disk, the reaction force from the thrust causes the rotary disk to spin or rotate with minimal losses. Faster spinning or rotation of the rotary disk results in greater centrifugal force applied to the compressed air/gas in the rotary arms, in turn further compressing the air/gas in the rotary arms and producing a higher thrust and a faster spinning or rotation rate. This "self-amplifying" chain reaction is an advantageous feature of the invention. In the present invention, the compressor(s), radial arms, combustion chambers and nozzles can work in synchronization, cooperation and/or synergy to efficiently produce very high revolution rates and high thrust, even in cases where the amount of fuel burned in the combustion chambers is relatively small.

In some embodiments, some or all of the nozzles can be positioned so that the gases exit in a direction other than perpendicular to the rotary disk radius. For example, some or all of the nozzles may point downward (e.g., for upward propulsion) or in between downward and horizontal for other purposes. The angle of the nozzles relative to a plane defined by the positions of the rotary arms may be adjustable.

Many components of the present engine may be constructed using light-weight and low-cost materials, such as fiberglass, carbon fiber, recycled plastics and the like. Even those components that require metal or another thermally-conductive material can be made using relatively light-weight and low-cost materials, such as aluminum or an alloy thereof (e.g., with up to 10% by weight of Cu, up to 0.5% by weight of vanadium and/or zirconium, up to 10% by weight of Mg and/or Ce, up to 20% by weight of Si, combinations thereof, etc.).

Figure 10:
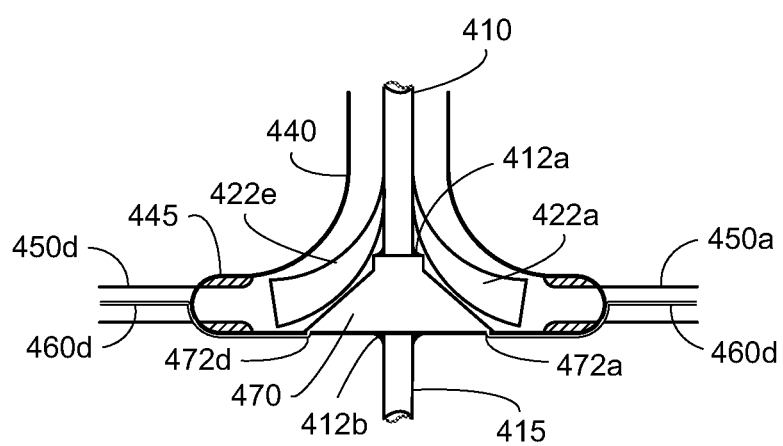
FIG. 10 shows an exemplary alternative rotary disk including a fuel storage tank or vessel according to one or more further embodiments of the present invention.

FIG. 10 shows a further embodiment of the present engine in which space in the manifold is used to store fuel. For example, the engine in FIG. 10 includes a storage tank or vessel 470 that stores fuel for the combustion chambers. The storage tank or vessel 470 may include an inlet (not shown)

and one or more outlets 472*a-f*. The fuel supply lines 465*a-f* may be connected or joined to the storage tank or vessel 470 at the outlets 472*a-f* (e.g., through a valve; not shown). Alternatively or additionally, a battery (not shown) may be present in place of or in part of the space occupied by the storage tank or vessel 470.

Exemplary Methods

The present invention further relates to methods of transferring or converting energy and generating electricity. In general, the methods comprise passing a fluid through the present apparatus (e.g., engine or rotary disk), thereby causing the apparatus and at least the lower or central axle or shaft to rotate, and transferring torque from the lower or central axle or shaft to another apparatus. In various embodiments of the method of transferring or converting energy, the other apparatus may be a gear (in turn coupled to yet another apparatus, such as an axle driving a belt), an engine, a cam or camshaft, etc. In various embodiments of the method of generating electricity, the other apparatus may be a generator configured to generate the electricity from the torque provided by the lower or central axle or shaft.

In one variation, the other apparatus is a differential that receives the torque from the lower axle or shaft and transfers it to another axle or shaft (e.g., the upper axle or shaft), as described herein. Thus, the upper axle or shaft may rotate at a rate that is from 1/x to x times the rotation rate of the lower axle or shaft, where x is >1 (e.g., 1.1-100, 1.2-50, 1.5-20, 2-10, or any other value or range of values >1).

In another variation of the methods, the method(s) may further comprise burning a fuel in the presence of excess air in a combustion chamber in fluid communication with the rotary disk. In such variations, the fluid is the combination of combustion gases and heated air. Such method(s) may also further comprise filtering the combustion gases and heated air, before and/or after passing the combustion gases and heated air through the rotary disk.

In other or further embodiments, the method may further comprise driving a Pelton wheel with the fluid that exits the nozzles (see, e.g., U.S. patent application Ser. No. 15/641,760, the relevant portions of which are incorporated herein by reference), and optionally generating an additional torque on an additional axle or shaft operatively coupled to the Pelton wheel. Such a method may also further comprise converting the additional torque to additional kinetic energy (e.g., to drive an additional mechanical device or apparatus, such as a belt, a gear, a cam or camshaft, etc.) or to additional electricity (e.g., using a generator).

In further embodiments, the method further comprises burning a fuel in a combustion chamber at an end of each rotary arm, as described herein. Burning the fuel may comprise supplying a fuel to the combustion chamber, igniting the fuel, and/or exhausting the combustion gases and the heated compressed gas (i.e., from the corresponding rotary arm) through the corresponding nozzle. The fuel may be supplied to the combustion chamber continuously or intermittently (e.g., periodically, at a frequency of 0.2-100 times per second), and the fuel supply frequency may vary with the rotation rate and/or any desired acceleration or deceleration of the rotary disk.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An engine, comprising:
    a) a housing enclosing a manifold and having (i) an outer circumference and (ii) an inlet configured to receive an oxygen-containing gas, the manifold being in fluid communication with the inlet;
    b) a first axle or shaft to which the housing is joined or fixed;
    c) a plurality of conduits or passages within and/or extending from the housing and to which the housing is joined or fixed, the plurality of conduits or passages receiving the oxygen-containing gas from the manifold;
    d) a plurality of combustion chambers at distal ends of the plurality of conduits or passages and external to the housing, wherein the plurality of combustion chambers are configured to receive the oxygen-containing gas from the plurality of conduits or passages and burn a fuel to heat at least some of the oxygen-containing gas;
    e) a plurality of nozzles at distal ends of the plurality of combustion chambers, configured to (i) receive the heated oxygen-containing gas and combustion gases from the plurality of combustion chambers and (ii) direct the heated oxygen-containing gas and combustion gases exiting the plurality of nozzles in a predetermined direction;
    f) a second axle or shaft colinear with the first axle or shaft;
    g) a compressor in the manifold or upstream from the inlet, comprising a plurality of fins or blades joined or fixed to the second axle or shaft, wherein the compressor is configured to increase a pressure of the oxygen-containing gas at entrances of the plurality of conduits or passages; and
    h) a differential between the first axle or shaft and the second axle or shaft, wherein the first and second axles or shafts rotate at different rates.

2. The engine of claim 1, wherein the housing comprises first and second plates, separated by one or more dividers.

3. The engine of claim 2, comprising a single divider having a center opening and a plurality of lateral openings, wherein the plurality of conduits or passages comprise a plurality of rotary arms inserted into or affixed to the plurality of lateral openings.

4. The engine of claim 3, wherein a number of the lateral openings equals a number of the rotary arms, the number of the rotary arms equals a number of the combustion chambers, and the number of the combustion chambers equals a number of the nozzles.

5. The engine of claim 3, wherein the compressor is in the manifold and has a diameter at its widest point of from 30 cm to 30 m, and the diameter of the compressor is less than a diameter of the center opening in the divider.

6. The engine of claim 3, wherein each of the plurality of nozzles and each of the plurality of combustion chambers have a maximum diameter that is equal to or less than an inner diameter of the plurality of rotary arms.

7. The engine of claim 1, wherein the first axle or shaft extends from the manifold and through the inlet.

8. The engine of claim 7, wherein the first axle or shaft further extends away from the inlet.

9. The engine of claim 1, wherein the compressor includes n fins or blades, wherein n is a positive integer by which 360 can be divided to give an integer or a regular fraction.

10. The engine of claim 1, wherein the predetermined direction is perpendicular to a radius of the housing or to a direction that a corresponding one of the conduits or passages is joined or connected to the manifold.

11. The engine of claim 1, further comprising a plurality of fuel supply lines configured to supply the fuel to the plurality of combustion chambers.

12. The engine of claim 11, wherein each of the plurality of combustion chambers further comprises (i) a port and/or fuel inlet configured to receive the fuel from a corresponding one of the plurality of fuel supply lines and (ii) an igniter configured to ignite the fuel in the combustion chamber when the oxygen-containing gas is in the combustion chamber.

13. The engine of claim 12, wherein the igniter is downstream from the port and/or fuel inlet.

14. The engine of claim 12, further comprising, external to the housing and adjacent to the manifold, a container configured to store the fuel therein and/or a battery configured to provide an electrical charge to the plurality of igniters.

15. The engine of claim 11, wherein each of the plurality of fuel supply lines has a width or diameter that is 1-20% of a corresponding diameter or width of the conduits or passages.

16. The engine of claim 11, wherein each of the plurality of combustion chambers has a front or nose facing a corresponding one of the plurality of conduits or passages with one or more openings therein configured to allow the oxygen-containing gas to pass into the combustion chamber.

17. An energy converter, comprising:
a) engine of claim 1; and
b) an electricity generator, communicatively coupled to the first axle or shaft or the second axle or shaft, configured to generate electricity from rotations of the first axle or shaft or the second axle or shaft.

18. A method of generating electricity, comprising:
a) passing the oxygen-containing gas through the engine of claim 1;
b) burning the fuel in the plurality of combustion chambers, thereby causing the engine and the first and second axles or shafts to rotate; and
c) transferring torque from the first or second axle or shaft to an electricity generator, thereby generating the electricity.

19. The engine of claim 1, wherein the first axle or shaft rotates at a rate that is m/n times a rate of rotation of the second axle or shaft, where m and n are integers$\geq 1$, and m>n.

20. The engine of claim 1, wherein the differential is within the housing and in the manifold, on an opposite side of the compressor from the inlet.

* * * * *